(12) United States Patent
Matoba

(10) Patent No.: US 8,917,409 B2
(45) Date of Patent: Dec. 23, 2014

(54) IMAGE FORMING APPARATUS AND IMAGE FORMING SYSTEM

(75) Inventor: Kazuo Matoba, Akashi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1709 days.

(21) Appl. No.: 11/987,652

(22) Filed: Dec. 3, 2007

(65) Prior Publication Data

US 2008/0137138 A1    Jun. 12, 2008

(30) Foreign Application Priority Data

Dec. 11, 2006 (JP) ................................. 2006-333900

(51) Int. Cl.
| | |
|---|---|
| G06F 3/12 | (2006.01) |
| G06F 21/60 | (2013.01) |
| H04N 1/00 | (2006.01) |
| G03G 15/00 | (2006.01) |
| H04N 1/34 | (2006.01) |
| G06F 21/35 | (2013.01) |
| H04N 1/32 | (2006.01) |

(52) U.S. Cl.
CPC ...... *G06F 3/1238* (2013.01); *H04N 2201/3278* (2013.01); *G06F 3/1292* (2013.01); *G06F 21/608* (2013.01); *H04N 2201/3205* (2013.01); *H04N 1/00307* (2013.01); *G03G 15/5075* (2013.01); *G06F 3/1222* (2013.01); *G06F 2221/2141* (2013.01); *H04N 2201/0094* (2013.01); *H04N 1/34* (2013.01); *G06F 3/1239* (2013.01); *G06F 2221/2135* (2013.01); *H04N 2201/0098* (2013.01); *H04N 2201/3273* (2013.01); *G06F 21/35* (2013.01); *H04N 1/32117* (2013.01)
USPC ......... 358/1.15; 358/1.1; 358/1.13; 358/1.14; 358/401; 358/501; 455/26.1; 455/39; 455/41.3; 455/556.1; 713/168; 713/176; 713/177; 713/178; 713/179

(58) Field of Classification Search
CPC .................. H04M 1/72527; H04M 1/72533; H04M 1/72563; H04M 1/72572; H04L 63/08
See application file for complete search history.

(56) References Cited

U.S. PATENT DOCUMENTS 6,747,755 B1  6/2004  Satomi et al.
7,389,063 B2  6/2008  Tomita et al.
(Continued)

FOREIGN PATENT DOCUMENTS

| JP | 2000-276017 A | 10/2000 |
|---|---|---|
| JP | 2003-323286 | 11/2003 |

(Continued)

OTHER PUBLICATIONS

Notification of Reasons for Refusal in JP 2006-333900 dated May 12, 2009, and an English Translation thereof.

(Continued)

*Primary Examiner* — Hilina K Demeter

(74) *Attorney, Agent, or Firm* — Buchanan Ingersoll & Rooney PC

(57) ABSTRACT

An image forming apparatus which can prohibit any users but a user who has made a deposit from operating the image forming apparatus for a chargeable process. A communication controller of the image forming apparatus obtains pieces of proper information of cell-phones. An ID management section issues IDs for the respective pieces of proper information, and the communication controller sends the IDs to the corresponding cell-phones. At an input section, a user of one of the cell-phones inputs the ID sent thereto. Thereafter, the communication controller receives an access from a cell-phone and receives proper information of the cell-phone. In this moment, it is judged whether the cell-phone which has made an access is identical with the cell-phone of which ID was inputted at the input section. Only when the communication controller identifies the cell-phone, the communication controller permits the image forming apparatus to communicate with the cell-phone.

13 Claims, 14 Drawing Sheets

(56) References Cited

U.S. PATENT DOCUMENTS

| | | | |
|---|---|---|---|
| 8,284,421 B2* | 10/2012 | Lee | 358/1.15 |
| 2001/0056406 A1* | 12/2001 | Nagoya et al. | 705/52 |
| 2002/0140963 A1* | 10/2002 | Otsuka | 358/1.14 |
| 2003/0063321 A1* | 4/2003 | Inoue et al. | 358/302 |
| 2003/0093675 A1 | 5/2003 | Hibino et al. | |
| 2003/0210420 A1 | 11/2003 | Yamauchi | |
| 2004/0141487 A1* | 7/2004 | Lee | 370/338 |
| 2004/0151204 A1* | 8/2004 | Eguchi et al. | 370/465 |
| 2004/0199651 A1* | 10/2004 | Kobayashi | 709/230 |
| 2005/0078337 A1* | 4/2005 | Ichikawa et al. | 358/1.15 |
| 2005/0099652 A1* | 5/2005 | Miyashita | 358/1.15 |
| 2005/0099653 A1* | 5/2005 | Kawaoka | 358/1.15 |
| 2005/0162699 A1* | 7/2005 | Fukunaga et al. | 358/1.18 |
| 2005/0264844 A1* | 12/2005 | Fujitani et al. | 358/1.15 |
| 2005/0270570 A1* | 12/2005 | Fujitani et al. | 358/1.15 |
| 2005/0270571 A1* | 12/2005 | Fujitani et al. | 358/1.15 |
| 2006/0136992 A1 | 6/2006 | Shigeeda | |
| 2006/0197978 A1* | 9/2006 | Kishimoto | 358/1.15 |

FOREIGN PATENT DOCUMENTS

| | | |
|---|---|---|
| JP | 2003-331135 | 11/2003 |
| JP | 2004-46226 A | 2/2004 |
| JP | 2004-153300 | 5/2004 |
| JP | 2005-254571 A | 9/2005 |
| JP | 2005-266855 A | 9/2005 |
| JP | 2006-127084 | 5/2006 |
| JP | 2006-145785 | 6/2006 |
| JP | 2006-203858 | 8/2006 |

OTHER PUBLICATIONS

Notification of Reasons for Refusal in JP 2006-333900 dated Nov. 18, 2008, and a English Translation thereof.

Office Action dated Dec. 15, 2009, issued in the corresponding Japanese Patent Application No. 2006-333900, and an English Translation thereof.

\* cited by examiner

FIG. 11
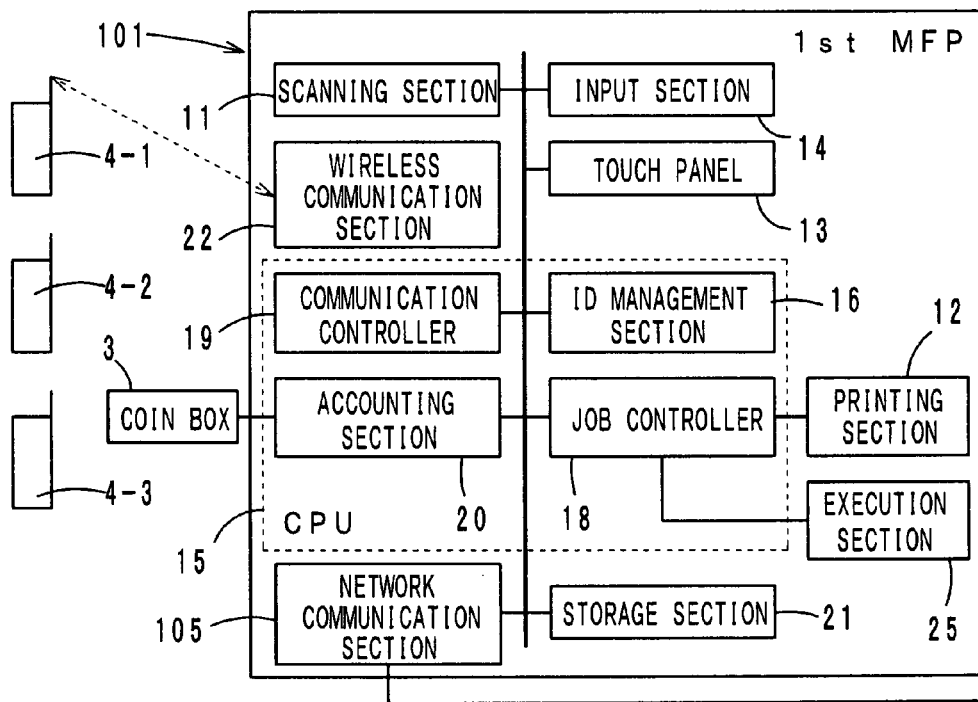
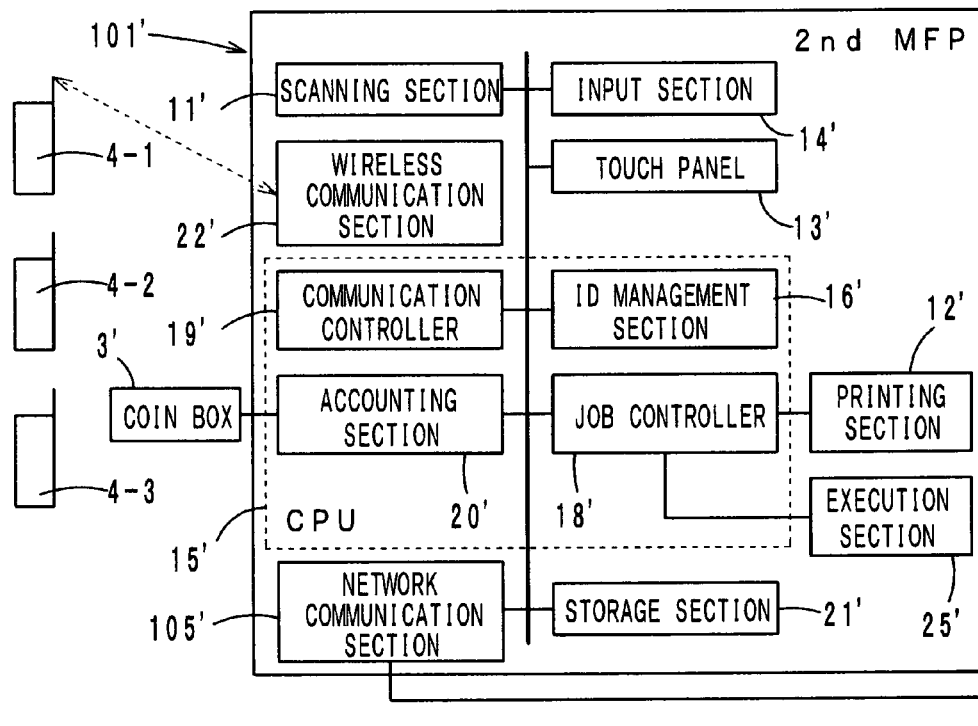

F I G . 1 5
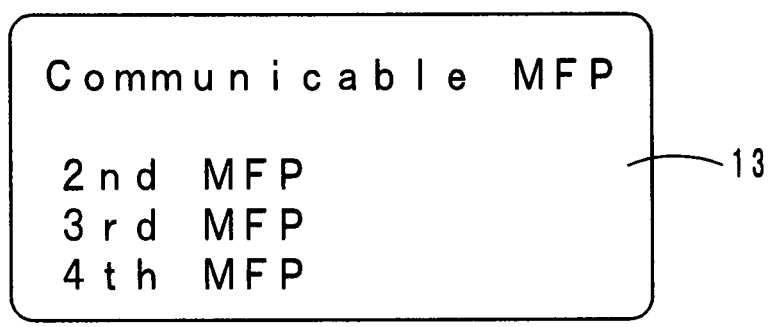

IMAGE FORMING APPARATUS AND IMAGE FORMING SYSTEM

This application is based on Japanese patent application No. 2006-333900 filed on Dec. 11, 2006, the content of which is hereby incorporated by reference.

BACKGROUND OF THE INVENTION

1. Field of the Invention

The present invention relates to an image forming apparatus and an image forming system, and more particularly to an image forming apparatus and an image forming system which are communicable with communication terminals, such as cell-phones, etc., by wireless.

2. Description of Related Art

Conventionally, in a convenience store or the like, a coin-operated image forming apparatus, for example, a copying machine provided with a coin box is installed. The coin box is a device which permits operation of the image forming apparatus within a deposit in the coin box made by a user. Such a coin-operated image forming apparatus is, for example, disclosed by Japanese Patent Laid-Open Publication No. 2004-46226 (Reference 1).

Also, Japanese Patent Laid-Open Publication No. 2000-276017 (Reference 2) discloses an accounting machine for managing deposits made by a plural number of users. In the accounting machine according to Reference 2, in order to distinguish deposits made by different users from each other, IDs of the respective users and the balances in the respective users' deposits are related to each other and are recorded in a table stored in the accounting machine. More specifically, before operating the image forming apparatus, each user inputs his/her ID into the accounting machine and deposits money in a coin box. Then, the accounting machine records the deposit and the user's ID in the table with the deposit and the ID related to each other. When the user starts operating the image forming apparatus, the user inputs his/her ID to register a printing process in the accounting machine. The accounting machine receives registration of printing processes from other users, who have made deposits in the accounting machine, with the printing processes related to the respective users' IDs. The printing processes are registered and stored in the order of receipt, and the image forming apparatus carries out the printing processes in the order of registration. Thereafter, the accounting machine deducts the charges for the respective printing processes from the deposits of the corresponding users.

Further, in recent years, with popularization of cell-phones, various systems which permits cooperation of image forming apparatuses and cell-phones with each other have been suggested. In such a system, for example, an image taken by a camera installed in a cell-phone is transmitted to an image forming apparatus by wireless, and the image forming apparatus prints a photo. Also, Japanese Patent Laid-Open Publication No. 2005-254571 (Reference 3) discloses a system wherein a cell-phone sends an internet address of a server stored with photo data and/or text data to an image forming apparatus, and the image forming apparatus makes an access to the internet address to download the photo data and/or the text data and prints a photo and/or a text in accordance with the photo data and/or the text data.

In such a system for permitting cooperation of image forming apparatuses and cell-phones with each other, however, there is a problem that a user other than a user which has deposited for a printing process can print a photo and/or a text. More specifically, in the system, data and a print command can be sent from a cell-phone to an image forming apparatus by wireless. Therefore, after a user is permitted to operate an image forming apparatus by depositing money in a coin box and before the user makes a data transmission command or a print command, if the image forming apparatus receives data and a print command sent from another user's cell-phone by wireless, the image forming apparatus will print the data. In this case, although the former user deposited money to operate the image forming apparatus, the latter user spends the money.

In the accounting machine disclosed by Reference 2, the amount of money deposited by a user and the user's ID are recorded in a table with the deposited amount and the user's ID related to each other, and charges for a printing process are deducted from the user's deposit. The accounting machine, therefore, does not have the above-described problem that a deposit made by a user may be spent by another user.

In the accounting machine, however, a user must input his/her ID twice, namely, at the time of depositing money and at the time of starting operation of the image forming apparatus, which is troublesome.

SUMMARY OF THE INVENTION

An object of the present invention is to provide an image forming apparatus and an image forming system which prohibit any users but a user who has made a deposit from operating the image forming apparatus for a chargeable process by taking a simple countermeasure.

A first aspect of the present invention relates to an image forming apparatus which is communicable with communication terminals by wireless. The image forming apparatus comprises: a proper information obtaining section for obtaining pieces of proper information of the communication terminals respectively from the communication terminals; an ID issuing section for issuing pieces of identification information for the respective pieces of proper information; a storage section for storing the pieces of proper information and the pieces of identification information with the pieces of proper information related to the respective pieces of identification information; a sending section for sending the pieces of identification information to the corresponding communication terminals; an ID reception section for receiving identification information inputted from outside; a receiving section for receiving proper information of a communication terminal when receiving an access from the communication terminal; a first judging section for judging whether the proper information received by the receiving section is identical with the proper information corresponding to the identification information received by the ID reception section; and a process executing section. In the image forming apparatus, when the first judging section judges that the proper information received by the receiving section is identical with the proper information corresponding to the identification information received by the ID reception section, the receiving section accepts a process execution command from the communication terminal which has made an access thereto, and the process executing section executes a process in accordance with the process execution command accepted by the receiving section.

In the image forming apparatus according to the first aspect of the present invention, the process execution command may be a print command, and the process executing section may be a printing section.

In the image forming apparatus according to the first aspect of the present invention, also, the ID reception section may include an interface for permitting a user of a communication terminal to input identification information.

The image forming apparatus according to the first aspect of the present invention may further comprise an accounting section for receiving a deposit made by a user of the communication terminal before the process executing section starts executing a process.

In the image forming apparatus, the accounting section may deduct charges for the executed process from the deposit made by the user.

In the image forming apparatus according to the first aspect of the present invention, the receiving section may receive an operation command from the communication terminal which has made an access thereto, and the image forming apparatus may further comprise: a second judging section for, before the first judging section makes a judgment, judging whether the operation command from the communication terminal is to command a chargeable operation; and an operation executing section for, when the second judging section judges that the operation command from the communication terminal is not to command a chargeable operation, executing the operation according to the operation command without a judgment by the first judging section.

In the image forming apparatus according to the first aspect of the present invention, the communication terminals may be cell-phones.

A second aspect of the present invention relates to an image forming system comprising a first image forming apparatus and a second image forming apparatus which are connected to each other to be communicable with each other, and the first image forming apparatus and the second image forming apparatus are communicable with communication terminals by wireless. The first image forming apparatus of the image forming system comprises: a proper information obtaining section for obtaining pieces of proper information of the communication terminals respectively from the communication terminals; an ID issuing section for issuing pieces of identification information for the respective pieces of proper information; a storage section for storing the pieces of proper information and the pieces of identification information with the pieces of proper information related to the respective pieces of identification information; a sending section for sending the pieces of identification information to the corresponding communication terminals; an ID reception section for receiving identification information inputted from outside; and a transmitting section for transmitting proper information corresponding to the identification information received by the ID reception section to the second image forming apparatus. The second image forming apparatus of the image forming system comprises: a transmitted information receiving section for receiving the proper information transmitted from said first image forming apparatus; a receiving section for receiving proper information of a communication terminal when receiving an access from the communication terminal; a judging section for judging whether the proper information received by the receiving section is identical with the proper information received by the transmitted information receiving section; and a process executing section. In the second image forming apparatus, when the judging section judges that the proper information received by the receiving section is identical with the proper information received by the transmitted information receiving section, the receiving section accepts a process execution command from the communication terminal which has made an access thereto, and the process executing section executes a process in accordance with the process execution command accepted by the receiving section.

A third aspect of the present invention is applying the second aspect of the present invention to an image forming apparatus which is communicable with communication terminals by wireless. More specifically, an image forming apparatus according to the third aspect of the present invention comprises: a proper information obtaining section for obtaining pieces of proper information of the communication terminals respectively from the communication terminals; an ID issuing section for issuing pieces of identification information for the respective pieces of proper information; a storage section for storing the pieces of proper information and the pieces of identification information with the pieces of proper information related to the respective pieces of identification information; a sending section for sending the pieces of identification information to the corresponding communication terminals; an ID reception section for receiving identification information inputted from outside; and a transmitting section for transmitting the proper information corresponding to the identification information received by the ID reception section to another image forming apparatus.

To the image forming apparatus according to the third aspect of the present invention, a plural number of other image forming apparatuses are connected, said image forming apparatus further comprising a selection section for permitting a user to select a desired one from the plural number of image forming apparatuses, and the transmitting section transmits the proper information to the image forming apparatus selected by the user.

A fourth aspect of the present invention is applying the second aspect of the present invention to an image forming apparatus which is communicable with communication terminals with proper information by wireless. More specifically, an image forming apparatus according to the fourth aspect of the present invention comprises: a transmitted information receiving section for receiving proper information of a communication terminal transmitted from another image forming apparatus; a receiving section for receiving proper information of a communication terminal when receiving an access from the communication terminal; a judging section for judging whether the proper information received by the receiving section is identical with the proper information received by the transmitted information receiving section; and a process executing section. In the image forming apparatus, when the judging section judges that the proper information received by the receiving section is identical with the proper information received by the transmitted information receiving section, the receiving section accepts a process execution command from the communication terminal which has made an access thereto, and the process executing section executes a process in accordance with the process execution command accepted by the receiving section.

A fifth aspect of the present invention relates to an image forming apparatus comprising a first image forming apparatus and a second image forming apparatus which are connected to each other to be communicable with each other, and the first image forming apparatus and the second image forming apparatus are communicable with communication terminals by wireless. The first image forming apparatus of the image forming system comprises: a proper information obtaining section for obtaining pieces of proper information of the communication terminals respectively from the communication terminals; and a transmitting section for transmitting the pieces of proper information obtained by the proper information obtaining section to said second image forming apparatus. The second image forming apparatus of the image forming system comprises: a transmitted information receiving section for receiving the pieces of proper information transmitted from said first image forming apparatus; an ID issuing section for issuing pieces of identification information for the respective pieces of proper information received by the transmitted information receiving section; a storage section for storing the pieces of proper information and the pieces of identification information with the pieces of proper information related to the respective pieces of identification information; a sending section for sending the pieces of identification information to the corresponding communication terminals; an ID reception section for receiving identification information inputted from outside; a receiving section for receiving proper information of a communication terminal when receiving an access from the communication terminal; a judging section for judging whether the proper information received by the receiving section is identical with proper information corresponding to the identification information received by the ID reception section; and a process executing section. In the second image forming apparatus, when the judging section judges that the proper information received by the receiving section is identical with proper information corresponding to the identification information received by the ID reception section, the receiving section accepts a process execution command from the communication terminal which has made an access thereto, and the process executing section executes a process in accordance with the process execution command accepted by the receiving section.

A sixth aspect of the present invention is applying the fifth aspect of the invention to an image forming apparatus which is communicable with communication terminals with proper information by wireless. More specifically, an image forming apparatus according to the fifth aspect of the present invention comprises: a transmitted information receiving section for receiving pieces of proper information of the communication terminals transmitted from another image forming apparatus; an ID issuing section for issuing pieces of identification information for the respective pieces of proper information of the communication terminals received by the transmitted information receiving section; a storage section for storing the pieces of proper information and the pieces of identification information with the pieces of proper information related to the respective identification information; a sending section for sending the pieces of identification information to the corresponding communication terminals; an ID reception section for receiving identification information inputted from outside; a receiving section for receiving an access from a communication terminal and receiving proper information of the communication terminal; a judging section for judging whether the proper information received by the receiving section is identical with the proper information corresponding to the identification information received by the ID reception section; and a process executing section. In the image forming apparatus, when the judging section judges that the proper information received by the receiving section is identical with the proper information corresponding to the identification information received by the ID reception section, the receiving section accepts a process execution command from the communication terminal which has made an access thereto, and the process executing section executes a process in accordance with the process execution command accepted by the receiving section.

BRIEF DESCRIPTION OF THE DRAWINGS

This and other objects and features of the present invention will be apparent from the following description with reference to the accompanying drawings, in which:

FIG. 11 is a block diagram showing the relationship among a first MFP, a second MFP and cell-phones in an image forming system according to a second embodiment of the present invention;

FIG. 15 is an illustration showing an exemplary MFP selection screen displayed on a touch panel;

DETAILED DESCRIPTION OF THE PREFERRED EMBODIMENTS

First Embodiment

[General Structure]

Figure 1:
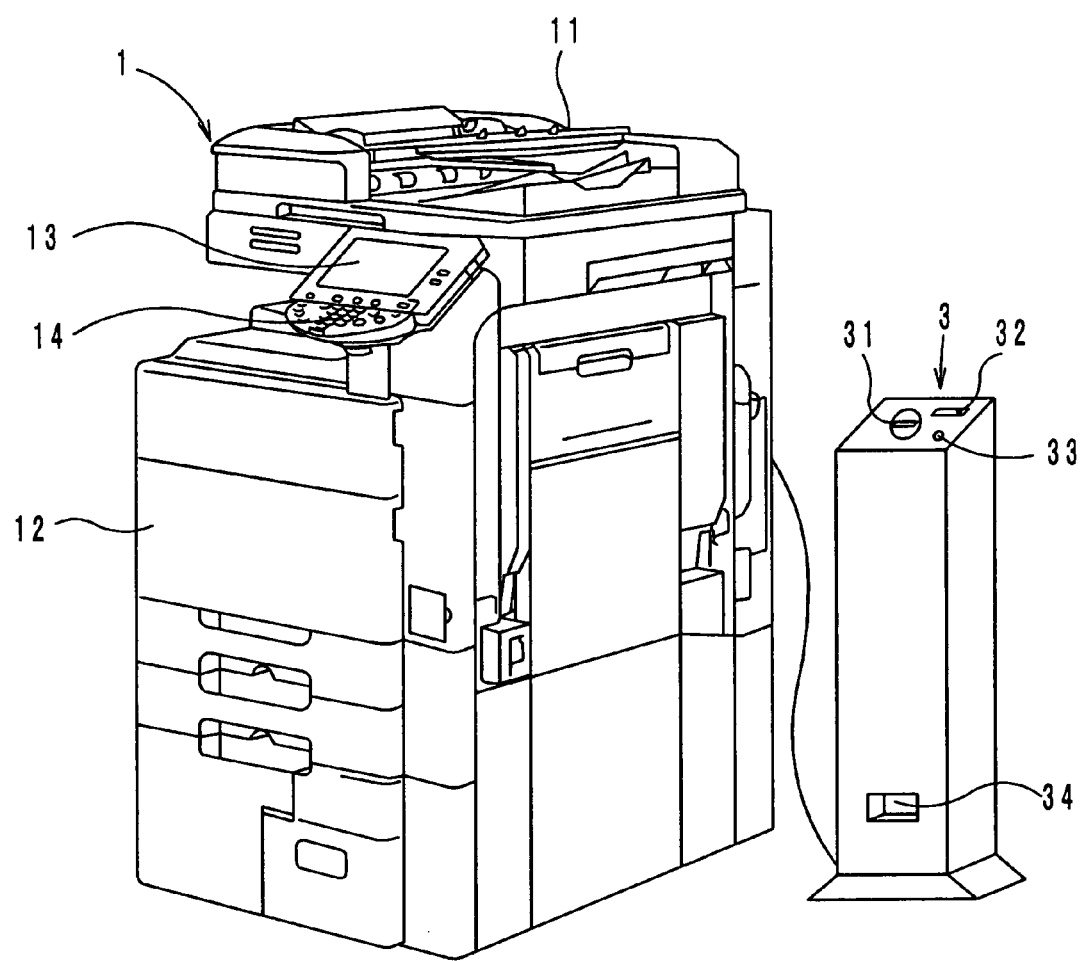
FIG. 1 is a perspective view of an MFP and a coin box.
Figure 2:
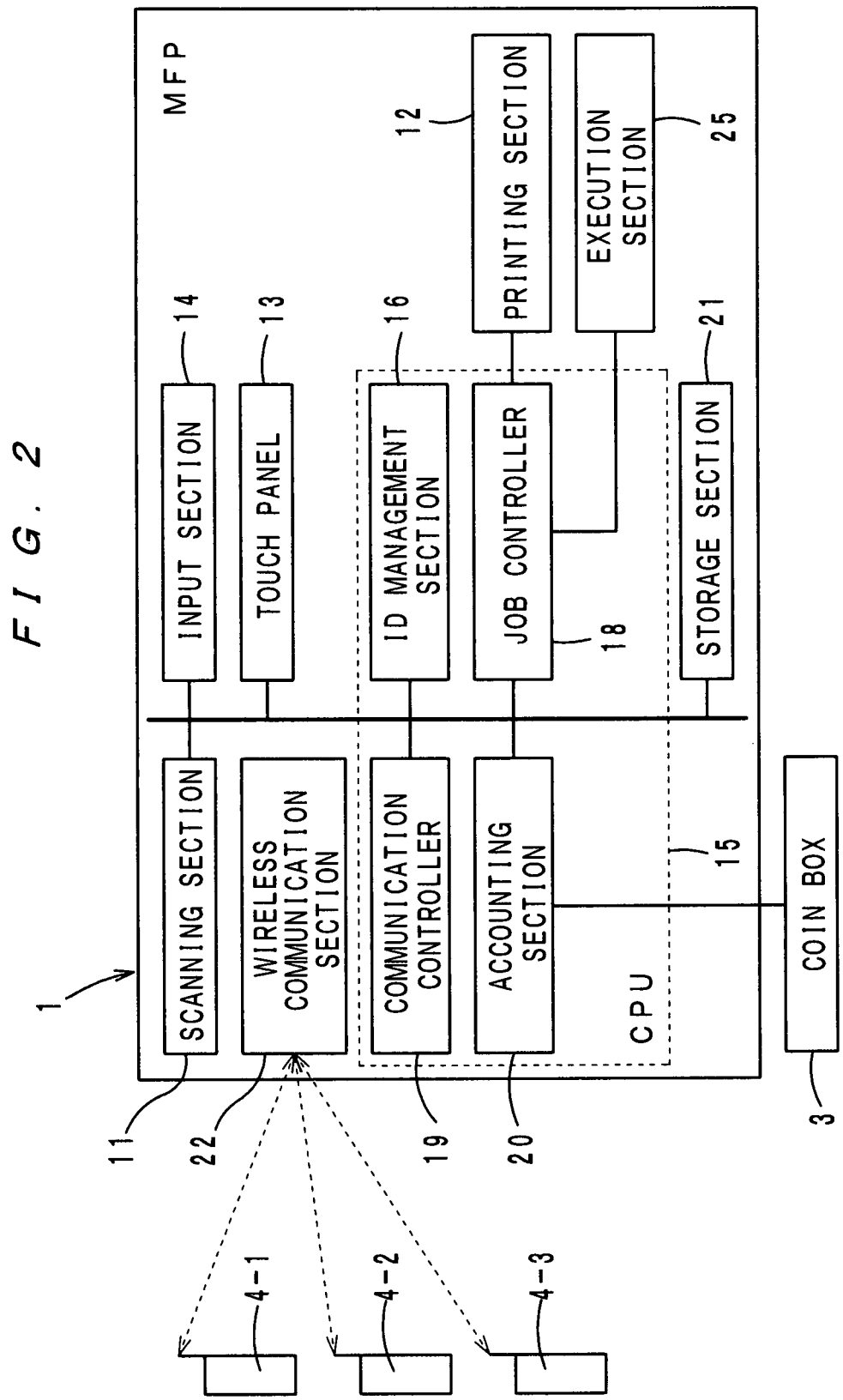
FIG. 2 is a block diagram showing the relationship among the MFP, the coin box and cell-phones in an image forming system according to a first embodiment of the present invention.

An image forming apparatus according to a first embodiment of the present invention is hereinafter described with reference to the accompanying drawings. In this embodiment, the image forming apparatus is an MFP (multi-function peripheral) for printing images. The MFP is connected to a coin box which performs accounting. FIG. 1 is a schematic perspective view of the MFP 1 and the coin box 3. FIG. 2 is a block diagram showing the relationship between the MFP 1, the coin box 3, and communication terminals 4, namely, cell-phones 4-1, 4-2 and 4-3.

First, referring to FIG. 1, the general structures of the MFP 1 and the coin box 3 are described. The MFP 1 has a function as a scanner for reading a document to obtain image data, as a printer for printing an image in accordance with print data and as a facsimile for sending and receiving facsimile data. The MFP 1 comprises a scanning section 11, a printing section 12, a touch panel 13 and an input section 14. The scanning section 11 reads a document to obtain image data. The printing section 12 prints an image in accordance with print data. The touch panel 13 displays information and receives inputs from a user. The input section 14 comprises a plural number of buttons and receives inputs from a user. The scanning section 11, the printing section 12, the touch panel 13 and the input section 14 are of types generally used for MFPs of this kind, and detailed descriptions are omitted.

The coin box 3 is an accounting machine which, when a user makes a deposit therein, permits the user to have services from the MFP 1 within the deposited amount. The coin box 3 comprises a coin slot 31, a display section 32, a refund button 33 and a refund outlet 34. The coin slot 31 is a slot through which a user feeds coins in the coin box 3. The display section 32 displays the balance of the deposit. The refund button 33, when it is pushed by the user, makes the coin box 3 refund the balance (change). From the refund outlet 34, the change comes out. The MFP 1 and the coin box 3 are installed in such a place to be used by the public, for example, in a convenience store or the like.

Next, referring to FIG. 2, operation of the MFP 1 is generally described.

When a user of the cell-phone 4-1 makes a deposit in the coin box 3, the MFP 1 turns to a status to print an image in accordance with a print command sent from one of the cell-phones 4 (4-1, 4-2 and 4-3) which exist in the periphery of the MFP 1 (for example, from the cell-phone 4-1) by wireless. (Printing an image in accordance with a command sent from a cell-phone is hereinafter referred to as cell-phone printing.) At this moment, the MFP 1 issues identification information (hereinafter referred to as ID or IDs), such as ID numbers, passwords or the like, to the respective cell-phones 4 (4-1, 4-2 and 4-3) so that the users of the cell-phones 4-2 and 4-3 cannot command the MFP 1 to execute cell-phone printing by spending the deposit made by the user of the cell-phone 4-1. Further, the MFP 1 promotes the user of the cell-phone 4-1 to input his/her ID on the touch panel 13. Then, the MFP 1 identifies the cell-phone 4-1 as the user which has made the deposit and receives a print command only from the identified user (cell-phone 4-1). In order to carry out this operation, the MFP 1 comprises the input section 14, a CPU 15, a storage section 21, a wireless communication section 22 and an executing section 25.

The wireless communication section 22 is an interface for short-distance wireless communication with the cell-phones 4 (4-1, 4-2 and 4-3) by Bluetooth (trade name) and incorporates an antenna for sending and receiving radio wave. The CPU 15 is a control section for controlling the MFP 1 and comprises an ID management section 16, a job controller 18, a communication controller 19 and an accounting section 20.

The communication controller 19 controls the wireless communication section 22. More specifically, the communication controller 19 works, in cooperation with the wireless communication section 22, to obtain proper information of the cell-phones 4 (4-1, 4-2 and 4-3) which exist around the MFP 1. The proper information is to identify each of the cell-phones 4 (4-1, 4-2 and 4-3) and for example, is a phone number or a serial number. The serial number is a peculiar number provided for the body or the internal board of each cell-phone. Thus, a piece of proper information is peculiar to the corresponding cell-phone 4-1, 4-2 or 4-3 and is never identical to any other piece of proper information of any other cell-phone.

The ID management section 16 issues IDs for the respective pieces of proper information obtained by the communication controller 19. The ID is, for example, a sequence of alphabets and/or digits. The ID management section 16 further records the proper information and the IDs in a management table with the pieces of proper information related to the respective IDs. In the management table, also, information on carrier companies of the cell-phones 4 (4-1, 4-2 and 4-3) is recorded. Here, the proper information of the cell-phone 4-1 is 080-1111-12\*\*, and the proper information of the cell-phone 4-2 is 090-1234-56\*\*. The proper information of the cell-phone 4-3 is 090-1111-11\*\*. The "\*" is an arbitrary digit.

TABLE 1

| Proper Information | Carrier Information | ID |
|---|---|---|
| 080-1111-12\*\* | A | geIHEibed |
| 090-1234-56\*\* | B | aoiOOaUq |
| 090-1111-11\*\* | C | kHOgfqBN |

The communication controller 19 also works, in cooperation with the wireless communication section 22, to send the IDs to the corresponding cell-phones 4 (4-1, 4-2 and 4-3) such that each of the IDs, which was issued for a piece of proper information, is provided for a cell-phone 4 with the piece of proper information.

The touch panel 13 is an interface for displaying information and for permitting a user to input information by touching. The input section 14 is an interface for permitting a user to input information and is a reception of an ID from a user.

The communication controller 19 works, in cooperation with the wireless communication section 22, to receive proper information of a cell-phone 4 when receiving an access from the cell-phone 4.

The ID management section 16 judges whether the proper information received by the communication controller 19 is identical with the proper information corresponding to the ID input at the input section 14.

Only when the ID management section 16 judges that the proper information received by the communication controller 19 is identical with the proper information corresponding the ID input at the input section 14, the communication controller 19 permits the cell-phone 4 to communicate via the wireless communication section 22. The job controller 18 receives a print command from the cell-phone 4 and makes a command to the printing section 12. In response to the command, the printing section 12 carries out a printing process.

On completion of the printing process, the accounting section 20 works, in cooperation with the coin box 3, to deduct charges for the printing process from the deposit in the coin box 3.

The storage section 21 is, for example, a rewritable storage medium such as a hard disk. The storage section 21 is stored with the management table as shown by Table 1.

The executing section 25 executes a process in accordance with a command from the job controller 18. The process includes, for example, collection of status information, such as information on the remaining of toner and the remaining of paper, information on the status of the MFP, etc. and sending of the information, which are executed in response to a request for status information from a cell-phone 4.

Figure 3:
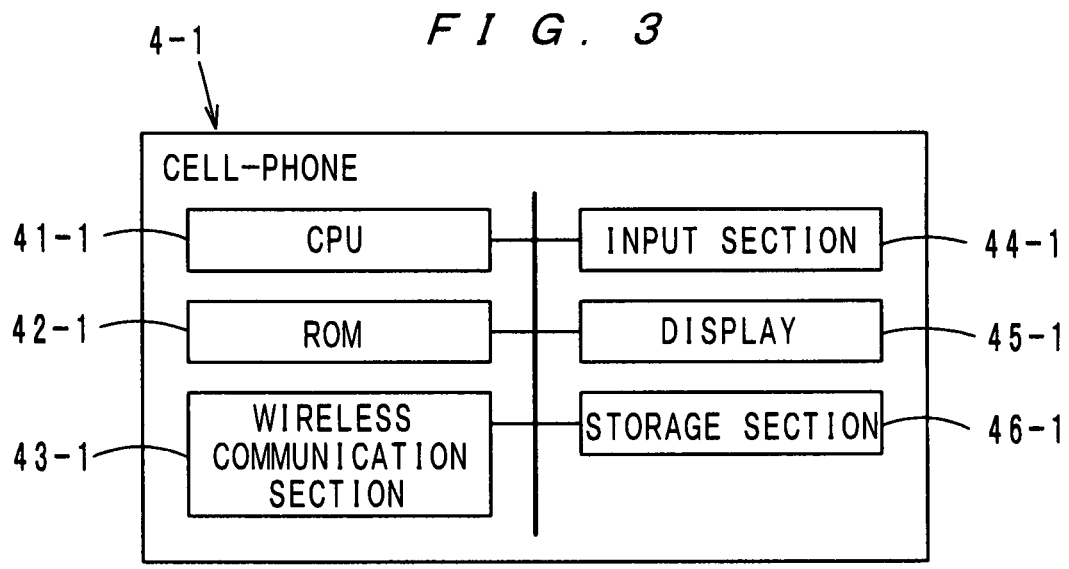
FIG. 3 is a block diagram showing a structure of a cell-phone.
Figure 4:
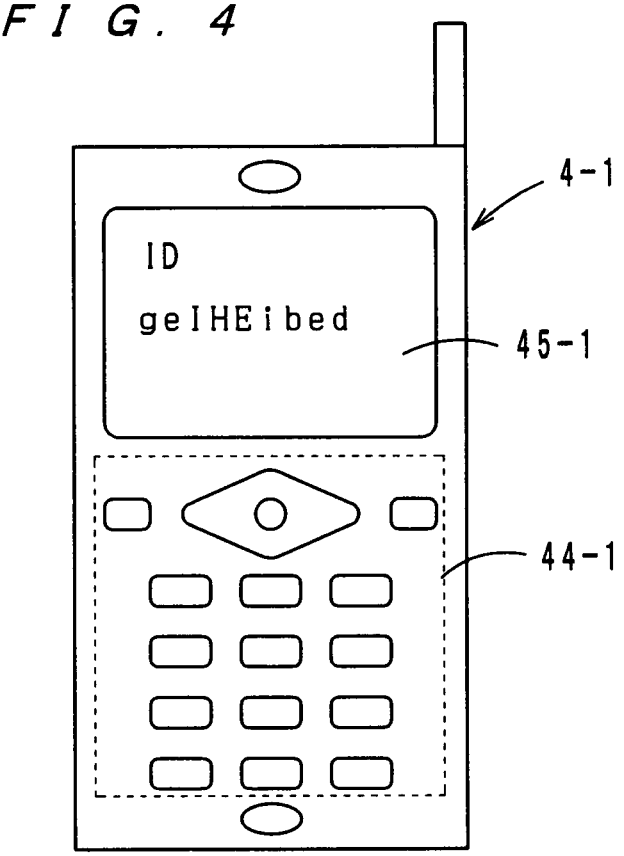
FIG. 4 is a sketch drawing of the cell-phone.

Next, referring to FIGS. 3 and 4, the cell-phones 4 (4-1, 4-2 and 4-3) are described. FIG. 3 is a block diagram showing the structure of the cell-phone 4-1. FIG. 4 is a sketch drawing of the cell-phone 4-1. The cell-phones 4-2 and 4-3 are of the same structure as that of the cell-phone 4-1, and descriptions and drawings of the cell-phones 4-2 and 4-3 are omitted.

The cell-phone 4-1 comprises a CPU 41-1, a ROM 42-1, a wireless communication section 43-1, an input section 44-1, a display 45-1 and a storage section 46-1. The CPU 41-1 controls the cell-phone 4-1. The ROM 42-1 is a read only memory stored with the proper information of the cell-phone 4-1. The wireless communication section 43-1 is an interface for short-distance wireless communication with the wireless communication section 22 of the MFP 1 by Bluetooth (trade name).

The input section 44-1 is, as shown by FIG. 4, an input interface comprising a plural number of buttons. The display 45-1 is, as shown by FIG. 4, a display for displaying, for example, information sent from the MFP, information stored in the ROM 42-1, etc. The storage section 46-1 is a rewritable memory for storing image data to be printed by the MFP 1.

In the following paragraphs, the parts and sections of the cell-phones 4-2 and 4-3 corresponding to the parts and sections of the cell-phone 4-1 shown in FIG. 4 may be distinguished from those of the cell-phone 4-1 by replacing the numbers 1 after the hyphens with numbers 2 and 3.

[Operation of MFP]

Figure 5:
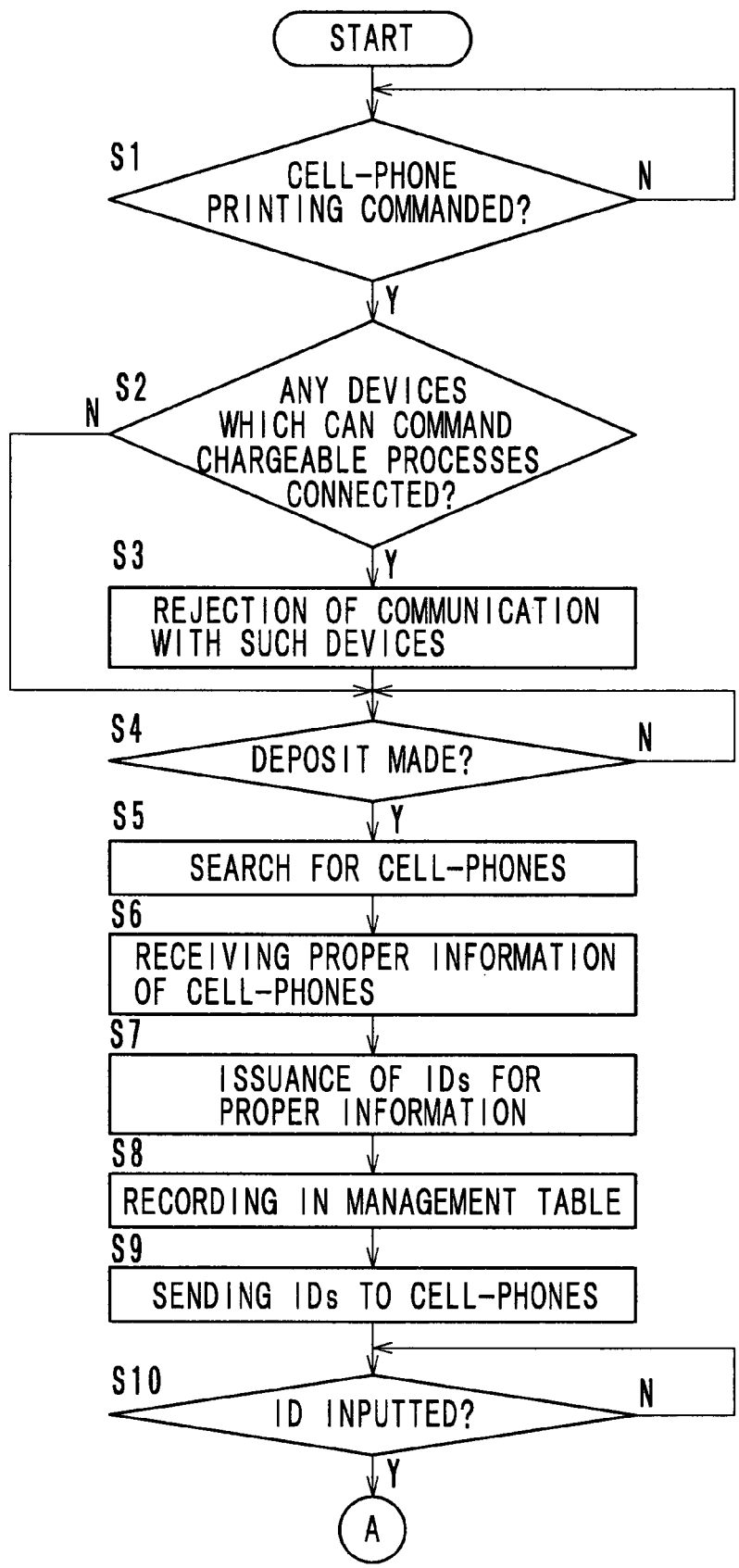
FIGS. 5 and 6 are flowcharts showing a procedure carried out by a CPU of the MFP.
Figure 6:
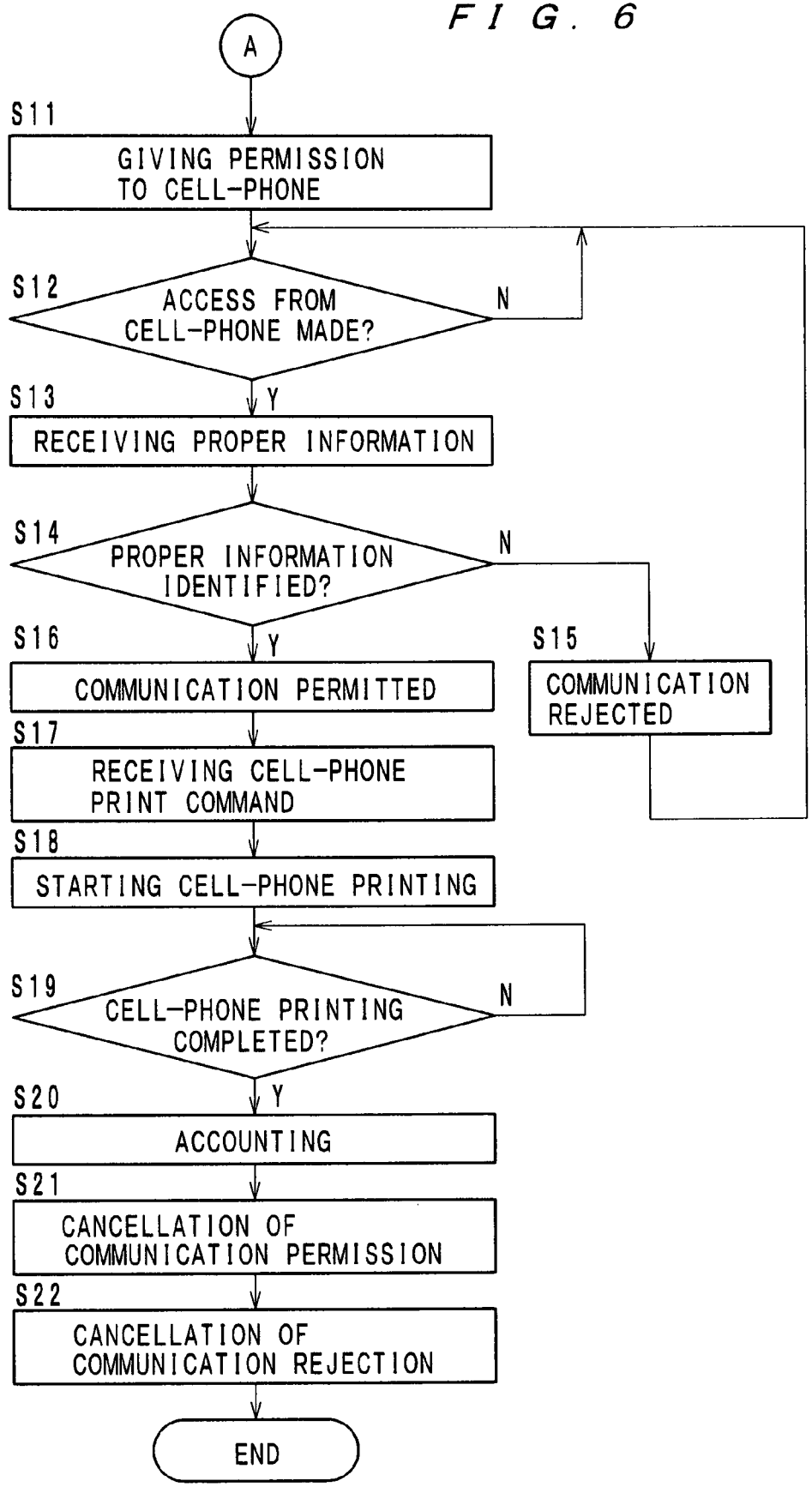

Operation of the MFP 1 is hereinafter described with reference to FIGS. 5 and 6. FIGS. 5 and 6 are flowcharts showing a procedure carried out by the CPU 15 of the MFP 1. Each process shown in the flowcharts may be executed by using a software in the CPU 15 or may be executed by using a hardware circuit for exclusive use.

Figure 7:
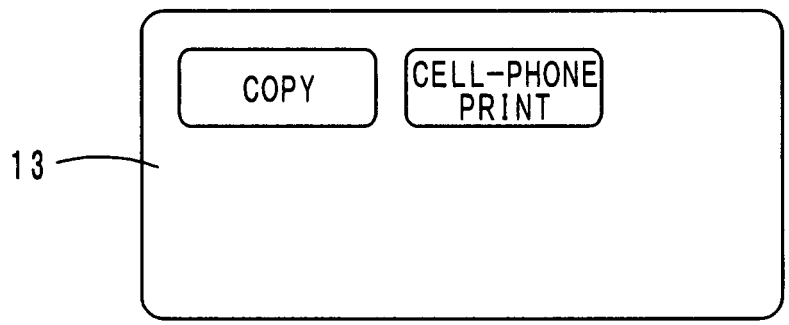
FIG. 7 is an illustration of an exemplary selection screen displayed on a touch panel.

First, a user of the cell-phone 4-1, who is standing in front of the MFP 1, selects either copying or cell-phone printing by touching a selection screen as shown in FIG. 7 displayed on the touch panel 13. The copying means making a copy of a printed material by use of the MFP 1. The cell-phone printing means sending image data from the cell-phone 4-1 to the MFP 1 and printing an image in accordance with the image data by use of the MFP 1. In the meantime, the job controller 18 stands by at step S1 while detecting whether the user has selected cell-phone printing. When the user has selected cell-phone printing, the processing goes to step S2.

When cell-phone printing has been selected, the job controller 18 detects whether any communication devices which can command the MFP 1 to carry out chargeable processes are connected to the MFP 1 (step S2). When such communication devices are connected to the MFP 1, the processing goes to step S3. When no such communication devices are connected to the MFP 1, the processing goes to step S4.

When such communication devices are connected to the MFP 1, the communication controller 19 denies communication with these communication devices (step S3). Thereby, the MFP 1 is prohibited from communicating with communication devices except the cell-phones 4 which can command cell-phone printing. The processes at steps S2 and S3 are to prohibit the MFP 1 from communicating with communication devices (for example, a personal computer, etc.) which can command the MFP 1 to carry out chargeable processes other than cell-phone printing. In other words, the processes at steps S2 and S3 are to prohibit communication devices which cannot handle cell-phone printing from communicating with the MFP 1. Thereafter, the processing goes to step S4.

At step S4, the accounting section 20 stands by while detecting whether a deposit has been made into the coin box 3. When the user of the cell-phone 4-1 has made a deposit, the deposited amount is notified from the coin box 3 to the accounting section 20 and is displayed on the display 13 shown in FIG. 1. At this moment, the accounting section 20 judges that a deposit has been made, and the processing goes to step S5.

Next, the communication controller 19 searches for cell-phones 4 (4-1, 4-2 and 4-3) existing in the periphery of the MFP 1 via the wireless communication section 22 (step S5). More specifically, the communication controller 19 commands the wireless communication section 22 to send radio wave to the cell-phones 4 (4-1, 4-2 and 4-3), and because the cell-phones 4-1, 4-2 and 4-3 exist in the periphery of the MFP 1, the cell-phones 4-1, 4-2 and 4-3 receive the radio wave via their wireless communication sections 43-1, 43-2 and 43-3. Then, the CPUs 41-1, 41-2 and 41-3 command the wireless communication sections 43-1, 43-2 and 43-3 to send the proper information stored in ROMs 42-1, 42-2 and 42-3 by radio wave, and the communication controller 19 receives the proper information of the cell-phones 4 (4-1, 4-2 and 4-3) via the wireless communication section 22 (step S6). In this embodiment, the proper information of a cell-phone is the phone number of the cell-phone as shown in Table 1.

The communication controller 19 sends the proper information to the ID management section 16. The ID management section 16 issues mutually different IDs for the three pieces of proper information (step S7). The IDs are generated, for example, by using random numbers. In this embodiment, an ID "geIHEibed" is provided for the cell-phone 4-1, an ID "aoi00aUq" is provided for the cell-phone 4-2, and an ID "kHogfqBN" is provided for the cell-phone 4-3. The ID management section 16 records the proper information and the IDs in a management table stored in the storage section 21 with the pieces of proper information related to the respective IDs (step S8). Further, the ID management section 16 sends the proper information and the IDs to the communication controller 19.

Figure 8:
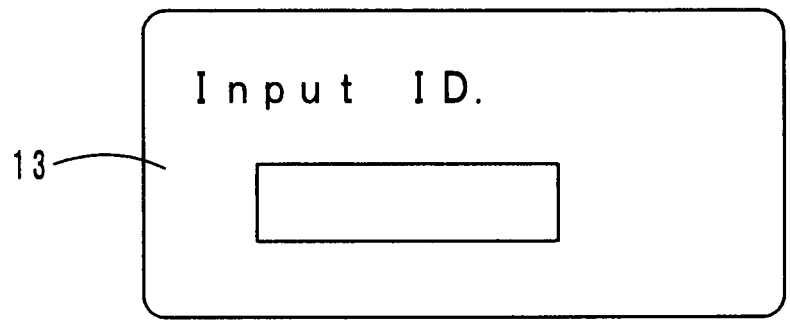
FIG. 8 is an illustration showing an input screen displayed on the touch panel.

After receiving the proper information and the IDs, the communication controller 19 commands the wireless communication section 22 to send the proper information and the IDs to the corresponding cell-phones 4-1, 4-2 and 4-3 (step S9). Then, the wireless communication sections 43-1, 43-2 and 43-3 of the cell-phones 4-1, 4-2 and 4-3 receive the proper information and the IDs. On reception of the IDs, the CPU 41-1, 41-2 and 41-3 of the cell-phones 4-1, 4-2 and 4-3 start applications for executing cell-phone printing, and as shown by FIG. 4, the display sections 45-1, 45-2 and 45-3 display the respective IDs corresponding to the respective pieces of proper information of the cell-phones 4-1, 4-2 and 4-3. At this moment, the touch panel 13 of the MFP 1 displays an input screen as shown by FIG. 8 for promoting a user to input an ID. The ID management section 16 stands by at step S10 while detecting whether an input of an ID from a user has been made. The user of the cell-phone 4-1, who deposited in the coin box 3, inputs the ID displayed on the display section 45-1 of the cell-phone 4-1 into the input screen displayed on the touch panel 13 of the MFP 1 via the input section 14. Thereby, the ID management section 16 receives the ID corresponding to the proper information of the cell-phone 4-1.

The ID management section 16 searches the management table as shown by Table 1 for proper information corresponding to the inputted ID and permits the cell-phone 4-1 with the proper information corresponding to the ID to communicate with the MFP 1 (step S11). More specifically, the ID management section 16 notifies the communication controller 19 of the proper information of the cell-phone 4-1, and thereafter, the communication controller 19 will permit the MFP 1 to receive data transmitted together with the proper information.

Next, the communication controller 19 stands by at step S12 while detecting whether the cell-phone 4-1 provided with communication permission has made an access thereto. The CPU 41-1 of the cell-phone 4-1 makes an access by commanding the wireless communication section 43-1 to send the proper information of the cell-phone 4-1. When the cell-phone 4-1 has made an access to the MFP 1, the processing goes to step S13.

The communication controller 19 of the MFP 1 receives proper information from a cell-phone 4 via the wireless communication section 22 when the cell-phone 4 makes an access thereto. Thus, the communication controller 19 receives the proper information of the cell-phone 4 which has made an access thereto (step S13), and the communication controller 19 sends the proper information to the ID management section 16.

Next, the ID management section 16 judges whether the proper information just received is identical with the proper information of the cell-phone 4-1 which was provided with communication permission at step S11 (step S14). At step S14, by the comparison in proper information, the ID management section 16 judges whether the cell-phone 4 (4-1, 4-2 or 4-3) which has made an access is identical with the cell-phone 4-1 provided with communication permission. When it is judged that the proper information just received is not identical with the proper information of the permitted cell-phone, the processing goes to step S15. When it is judged that the proper information just received is identical with the proper information of the permitted cell-phone, the processing goes to step S16.

When the proper information just received is not identical with the proper information of the permitted cell-phone, the ID management section 16 judges that a cell-phone 4 other than the permitted cell-phone 4-1 has made an access, and the communication controller 19 rejects communication with the cell-phone 4 which has made an access at step S12 (step S15). In this case, the communication controller 19 may notify the cell-phone 4 of rejection of communication. Thereafter, the processing returns to step S12.

When the proper information just received is identical with the proper information of the permitted cell-phone, the ID management section 16 judges that the permitted cell-phone 4-1 has made an access. Then, at step S16, the communication controller 19 permits the cell-phone 4-1 which made an access at step S12 to communicate with the MFP 1. More specifically, the communication controller 19 gives permission to the cell-phone 4-1 via the wireless communication section 22. The wireless communication section 43-1 of the cell-phone 4-1 receives the communication permission and forwards the communication permission to the CPU 41-1. Thereby, the CPU 41-1 knows that the cell-phone 4-1 has been permitted to communicate with the MFP 1, and the display section 45-1 displays information of communication permission.

Figure 9:
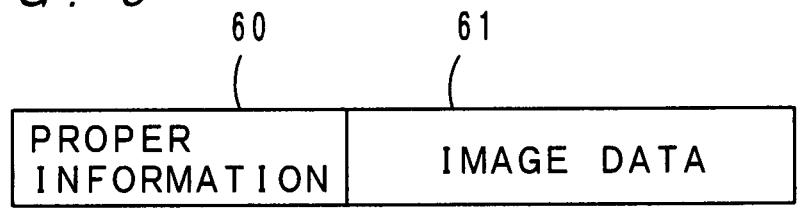
FIG. 9 is an illustration showing a data structure of a command for cell-phone printing.

Then, the user of the cell-phone 4-1 operates the input section 44-1 of the cell-phone 4-1 to select an image to be printed and operates for cell-phone printing. The CPU 41-1 commands the wireless communication section 43-1 to send a command for cell-phone printing. FIG. 9 shows the data structure of a command for cell-phone printing. The command for cell-phone printing is a combination of proper information 60 of the cell-phone 4-1 and image data 61 to be printed. The communication controller 19 of the MFP 1 receives the command for cell-phone printing via the wireless communication section 22 (at step S17). Further, the communication controller 19 sends the command for cell-phone printing to the job controller 18.

The job controller 18 which has received the command for cell-phone printing controls the printing section 12 to start a printing process to print an image in accordance with the image data 61 (step S18). During the printing process, the job controller 18 stands by at step S19 while detecting whether the printing process has been completed. On completion of the printing process, the processing goes to step S20.

Next, the accounting section 20 performs accounting at step S20. More specifically, the accounting section 20 sends information on charges for the printing process to the coin box 3, and the charges are deducted from the deposit made in the coin box 3. Then, the balance of the deposit is displayed on the display section 32 of the coin box 3.

Next, the communication controller 19 cancels the communication permission provided for the cell-phone 4-1 (step S21) and concurrently cancels the communication rejections provided for the other communication devices (step S22). Thereby, the MFP 1 returns to the initial state before the start of the cell-phone printing, and the cell-phone printing is completed. Then, the application exclusively used for cell-phone printing of the cell-phone 4-1 is completed.

With the MFP 1 described above, nobody can execute cell-phone printing but the user which has made a deposit. More specifically, the MFP 1 issues IDs to cell-phones 4 (4-1, 4-2 and 4-3) existing in the periphery and requests the cell-phone 4-1 to input its ID. Thereby, the MFP 1 identifies the cell-phone 4-1 and rejects communication with the other cell-phones 4. After receiving the ID of the cell-phone 4-1, the MFP 1 rejects commands for cell-phone printing from other cell-phones 4. Thus, it is prevented that a deposit made by a user may be spent by another user.

There may be trouble that a user other than a user who has made a deposit may input the ID to be permitted to make a command for cell-phone printing. In this embodiment, however, since a user must input an ID at the input section 14 of the MFP 1, the trouble can be avoided. More specifically, in the above-described MFP 1, after a user makes a deposit, the user inputs the ID at the input section 14. As shown by FIG. 3, the input section 14 is located by the coin box 3. Therefore, it is almost impossible that a user other than the user who has made a deposit may input the ID at the input section 14. Thus, trouble that a deposit made by a user may be spent by another user can be avoided.

In the MFP 1, with a simple operation, the trouble that a deposit made by a user may be spent by another user can be prevented. This is described below.

The accounting machine according to Reference 2 manages a deposit made by a user relating the deposit to the user's ID, and the user must input his/her ID twice, namely, at the time of depositing money and at the time of operating the image forming apparatus.

In the MFP 1, on the other hand, an ID is automatically issued, and the user must input the ID only once at the time of operating the MFP 1. Thus, in the MFP 1, with a simple operation, the trouble that a deposit made by a user may be spent by another user can be prevented.

In the MFP 1, further, with simple management of information, the trouble that a deposit made by a user may be spent by another user can be prevented.

The accounting machine according to Reference 2 manages a deposit made by a user relating the deposit to the user's ID and manages a printing process relating the printing process to the user's ID. In this method, therefore, in order to relate a deposit made by a user to the user's ID, a control procedure to connect an image forming apparatus body, into which a use's ID is input, and a coin box, into which money is deposited, to each other is necessary. Further, the balance of the deposit, which is changeable, and a user's ID must be managed, and management of information is complex.

The MFP 1, on the other hand, manages an ID and proper information of a cell-phone relating them to each other. Therefore, to a well-known procedure for permitting a user which has made a deposit in a coin box to operate an image forming apparatus, only a process for accepting or rejecting an access from each cell-phone is added. Thus, in the MFP 1, with simple management of information, the trouble that a deposit made by a user may be spent by another user can be prevented. Further, by using the proper information of each cell-phone as the ID of the cell-phone, management of information will be simpler.

[Modification]

Figure 10:
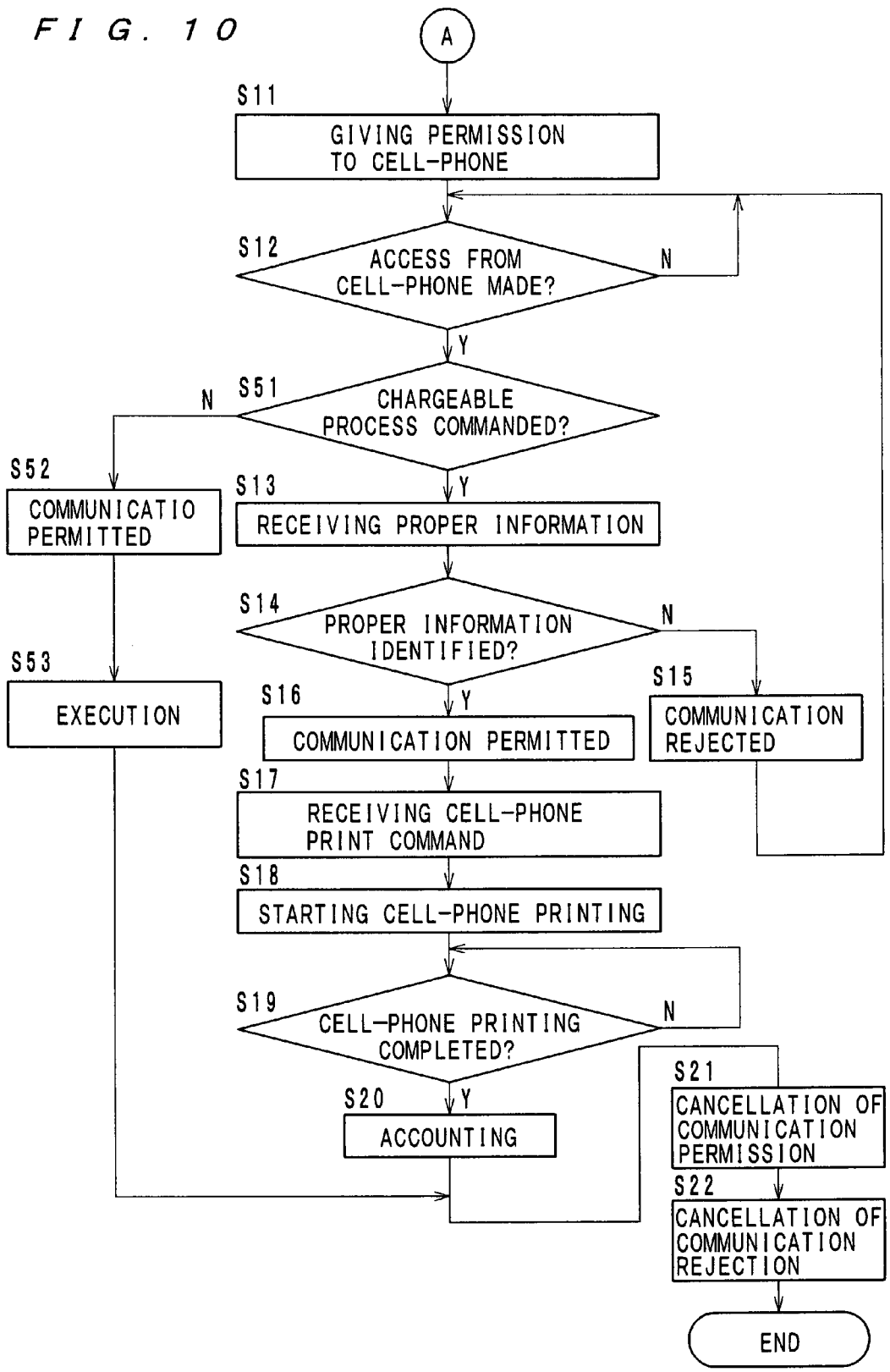
FIG. 10 is a flowchart showing a procedure carried out by a CPU of an MFP in a modified image forming system according to the first embodiment.

Referring to FIG. 10, a modification of the image forming apparatus according to the first embodiment is described. FIG. 10 is a flowchart showing a procedure carried out by the CPU 15 of the modified MFP 1. Before the flowchart shown by FIG. 10, the CPU 15 carries out steps S1 to step S10 shown in FIG. 5.

Processes at steps S11 and S12 carried out by the CPU 15 are the same as those at steps S11 and S12 shown in FIG. 6, and detailed descriptions of these processes are omitted.

When the communication controller 19 receives an access from a cell-phone 4, the communication controller 19 examines the kind of process commanded by the cell-phone 4 and judges whether the process is chargeable (step S51). Here, chargeable processes mean processes for which a user is charged, such as cell-phone printing, etc. On the other hand, non-chargeable processes are, for example, a response to a request for status information, such as information on the remaining of paper and on the remaining of toner in the MFP 1, etc. When the process commanded by the cell-phone 4 is chargeable, the processing goes to step S13. Processes at steps S13 to S22 are the same as those at steps S13 to S22 shown in FIG. 6, and detailed descriptions of these processes are omitted. When the process commanded by the cell-phone 4 is not chargeable, the processing goes to step S52.

When the process is not chargeable, the communication controller 19 sends communication permission to the cell-phone 4 (step S52). Then, the wireless communication section 43 of the cell-phone 4 receives the communication permission, and the CPU 41 of the cell-phone 4 sends a command so as to command the MFP 1 to execute the process. The communication controller 19 receives the command for the process via the wireless communication section 22.

The communication controller 19, then, forwards the command to the job controller 18. The job controller 18 controls the execution section 25 of the MFP 1 to execute the process (step S53). Thereafter, the processing goes to step 21. The processes at steps S21 and S22 are the same as those at steps S21 and S22 shown in FIG. 6, and detailed descriptions of these processes are omitted.

Second Embodiment

An image forming system according to a second embodiment of the present invention is hereinafter described. FIG. 11 is a block diagram of the image forming system comprising a first MFP 101, a second MFP 101' and cell-phones 4-1, 4-2 and 4-3.

In the image forming system, the first MFP 101 receives reservations for cell-phone printing, and the second MFP 101' executes cell-phone printing. Specifically, the first MFP 101 provides IDs for respective pieces of proper information of the cell-phones and promotes the user of the cell-phone 4-1 to input the ID. Based on the inputted ID, the first MFP 101 identifies the cell-phone 4-1 as the cell-phone of a user which has made a deposit, and the first MFP 101 sends the proper information of the cell-phone 4-1 to the second MFP 101'. The second MFP 101' judges whether the proper information sent from the first MFP 101 is identical with the proper information of a cell-phone 4 which has made an access.

When the cell-phone 4 which has made an access is identified by the proper information, cell-phone printing is executed. This is described in detail below.

The first MFP 101 and the second MFP 101' shown in FIG. 11 are connected to be communicable with each other via a network such as a LAN, an internet or the like. Further, a plural number of MFPs (not shown) as well as the second MFP 101' are connected to the first MFP 101 to be communicable with each other via the network. The first MFP 101 comprises a scanning section 11, a printing section 12, a touch panel 13, an input section 14, a CPU 15, a storage section 21, a wireless communication section 22, an execution section 25 and a network communication section 105. The second MFP 101' comprises a scanning section 11', a printing section 12', a touch panel 13', an input section 14', a CPU 15', a storage section 21', a wireless communication section 22', an execution section 25' and a network communication section 105'. The first MFP 101 and the second MFP 101' are of the same structure as the MFP 1 according to the first embodiment, except having the network communication sections 105 and 105' respectively. The first MFP 101 and the second MFP 101' function partly differently from the MFP 1 according to the first embodiment, and the differences are described below.

First, the structure of the first MFP 101 is described. The wireless communication section 22 is an interface for short-distance wireless communication between a cell-phone 4 (4-1, 4-2 or 4-3) and Bluetooth (trade name) and is incorporated with an antenna for sending and receiving radio wave. The CPU 15 is a controller of the first MFP 101, and the CPU 15 comprises an ID management section 16, a job controller 18, a communication controller 19 and an accounting section 20.

The communication controller 19 controls a wireless communication section 22. More specifically, the communication controller 19 works, in cooperation with the wireless communication section 22, to obtain pieces of proper information from cell-phones 4 (4-1, 4-2 and 4-3) existing in the periphery of the first MFP 101.

The ID management section 16 issues IDs for the respective pieces of proper information obtained by the communication controller 19.

The communication controller 19 also works, in cooperation with the wireless communication section 22, to send the IDs to the corresponding cell-phones 4 (4-1, 4-2 and 4-3).

The touch panel 13 is an interface for displaying information and for permitting a user to input information by touching. In this embodiment, with the touch panel 13, a user of a cell-phone 4 can select one from a plural number of MFPs as a machine executing cell-phone printing. The input section 14 is an interface for permitting a user to input information and for receiving an input of an ID from a user.

The storage section 21 is a storage stored with an MFP table as shown by Table 2 in which MFPs and their IP addresses communicable with the first MFP 101 are recorded.

TABLE 2

| Communicable MFP | IP Address |
| --- | --- |
| Second MFP | 192.168.100.10 |
| Third MFP | 192.168.200.20 |
| Fourth MFP | 192.168.300.30 |

The network communication section 105 is an interface for connecting the first MFP 101 to the network. Specifically, the network communication section 105 transmits a piece of proper information corresponding to an ID inputted at the input section 14 to the second MFP 101'.

Next, the second MFP 101' is described. The network communication section 105' is an interface for connecting the second MFP 101' to the network. Specifically, the network communication section 105' receives a piece of proper information sent from the first MFP 101.

The touch panel 13' is an interface for displaying information and for permitting a user to input information by touching.

The communication controller 19' works, in cooperation with the wireless communication section 22', to receive proper information from a cell-phone 4 which has made an access.

The ID management section 16' judges whether a piece of proper information received by the communication controller 19' is identical with a piece of proper information received by the network communication section 105'.

The communication controller 19' provides permission to communicate via the wireless communication section 22' only for a cell-phone 4 which has been identified by the ID management section 16'. The job controller 18' sends a print command to the printing section 12' in response to a command for cell-phone printing sent from a cell-phone 4.

The accounting section 20' works, in cooperation with the coin box 3', to deduct charges for a printing process from a deposit in the coin box 3'.

The storage section 21' is a rewritable memory, such as a hard disk or the like, and is stored with a management table as shown by Table 1.

The execution section 25' executes a process in accordance with a command sent from the job controller 18'. The process is, for example, confirmation of the remaining of toner and the remaining of paper.

[Operation of First MFP and Operation of Second MFP]

Figure 12:
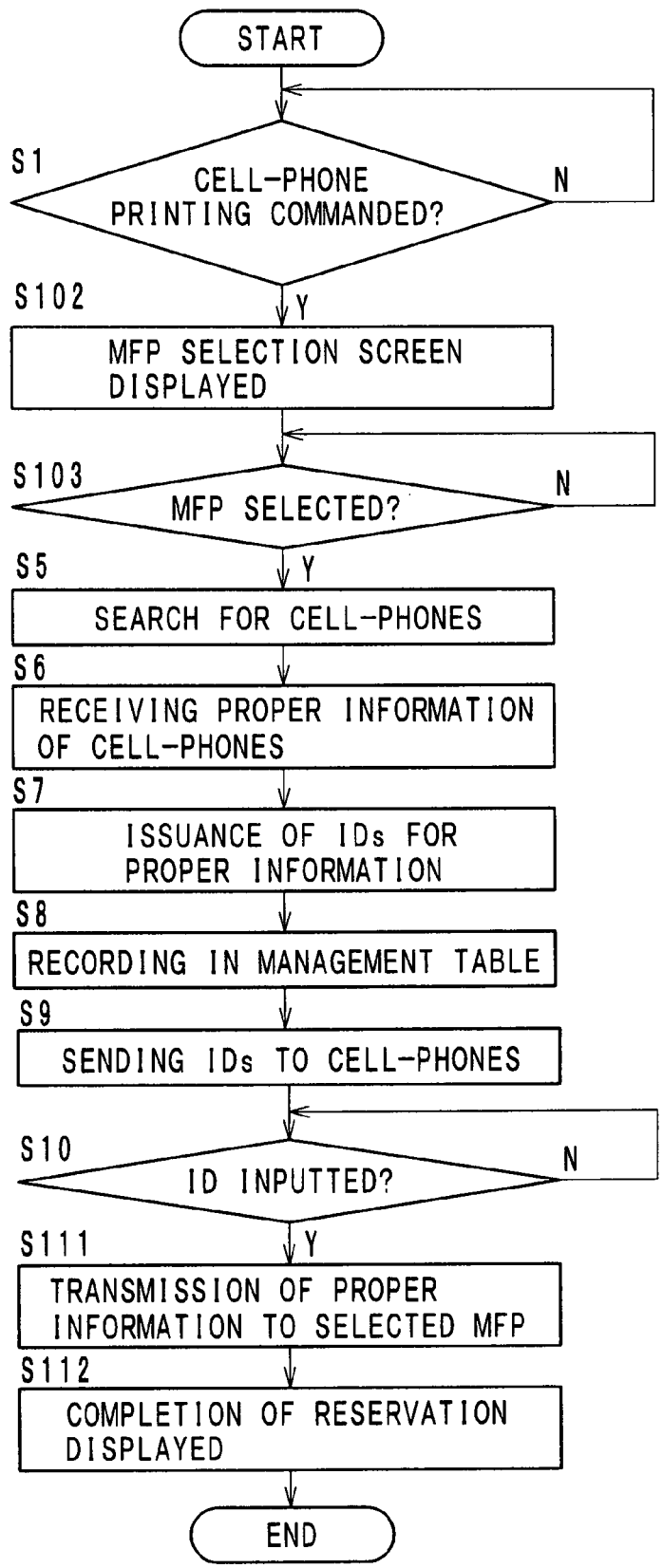
FIG. 12 is a flowchart showing a procedure carried out by a CPU of the first MFP in the image forming system according to the second embodiment.
Figure 13:
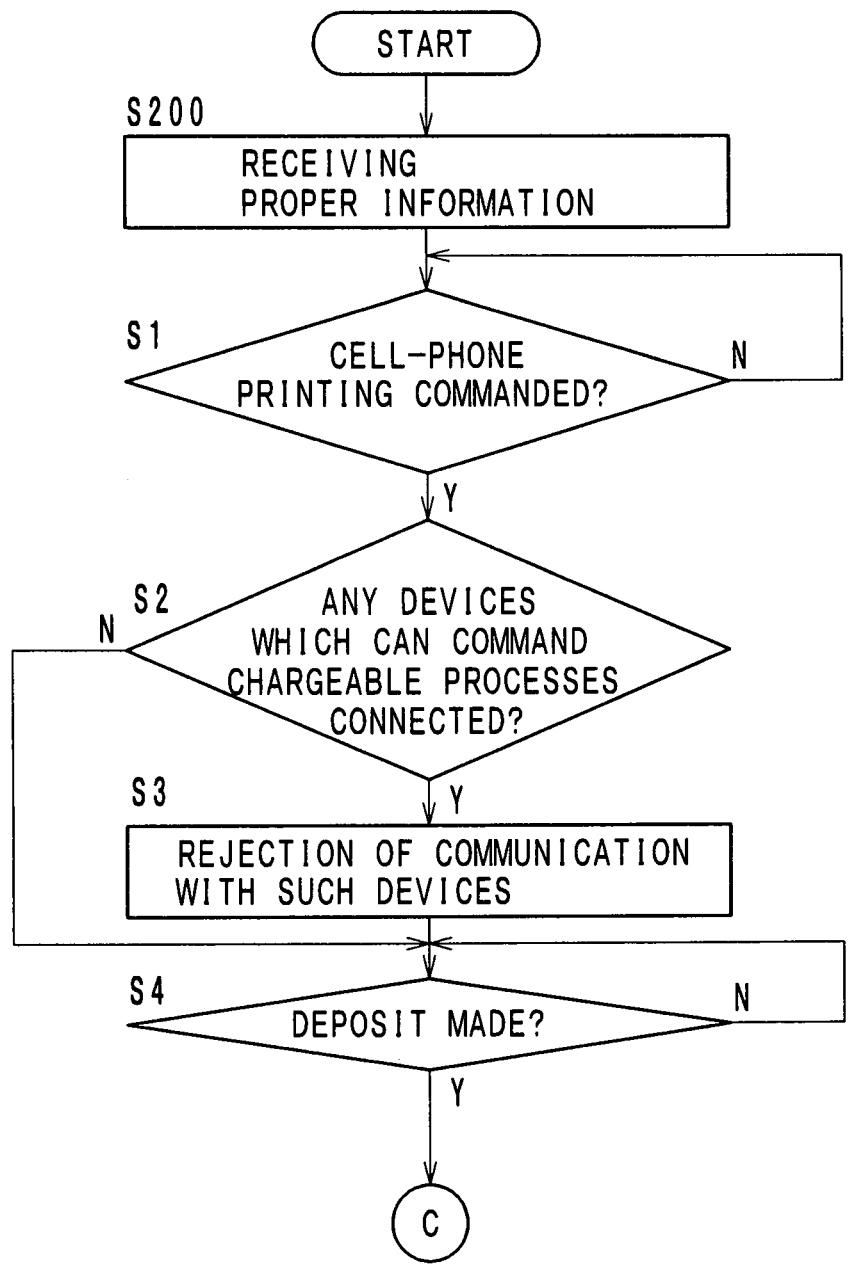
FIGS. 13 and 14 are flowcharts showing a procedure carried out by a CPU of the second MFP in the image forming system according to the second embodiment.
Figure 14:
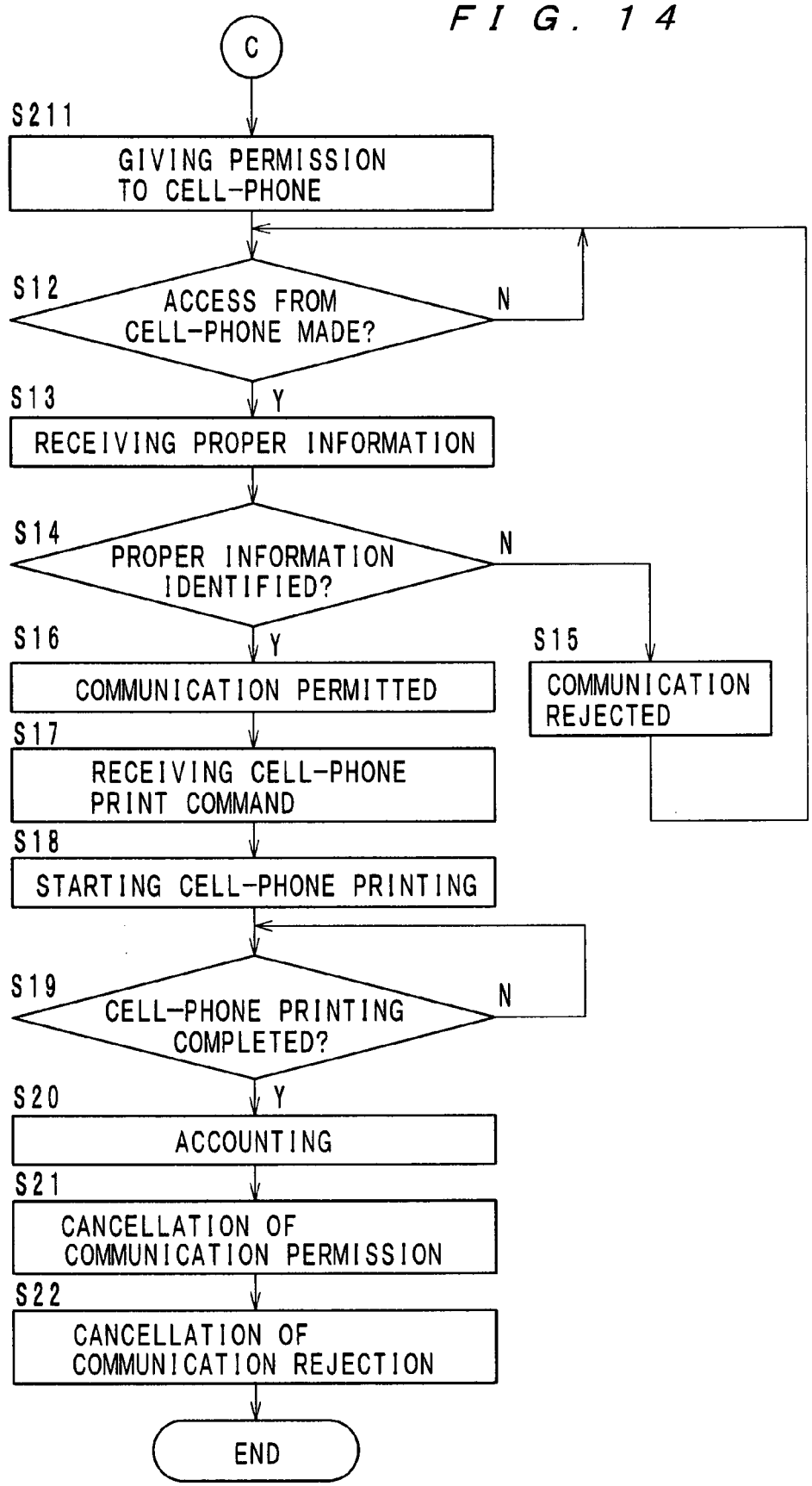

Referring to FIGS. 12, 13 and 14, operation of the first MFP and operation of the second MFP are described. FIG. 12 is a flowchart showing a procedure carried out by the CPU 15 of the first MFP 101. FIGS. 13 and 14 are flowcharts showing a procedure carried out by the CPU 15' of the second MFP 101'. Processes in the flowcharts may be executed by using softwares in the CPU 15 and in the CPU 15' or by using hardware circuits for exclusive use.

First, referring to FIG. 12, operation of the first MFP 101 is described. A process carried out by the first MFP 101 at step S1 is the same as the process carried out by the MFP 1 at step S1 shown in FIG. 5, and a description of the process is omitted.

When a command for cell-phone printing is received at step S1, the job controller 18 controls the touch panel 13 to display an MFP selection screen, where communicable MFPs are listed based on the MFP table as shown in Table 2 stored in the storage section 21 (step S102). FIG. 15 shows an exemplary MFP selection screen. The MFP selection screen shown by FIG. 15 shows that a third MFP and a fourth MFP as well as the second MFP 101' are communicable.

While the MFP selection screen is displayed, the job controller 18 stands by at step S103 while detecting whether a user has selected one from the list of MFPs. The user selects one from the MFPs listed on the MFP selection screen. Thereby, the job controller 18 knows which MFP shall execute cell-phone printing. In this embodiment, the second MFP 101' is supposed to have been selected as a MFP to carry out cell-phone printing. Thereafter, the processing goes to step S5. Processes carried out by the MFP 101 at steps S5 to S10 are the same as those carried out by the MFP 1 at steps S5 to S10, and descriptions of these processes are omitted.

When an ID is input at step S10, the ID management section 16 searches the management table as shown by Table 1 for a piece of proper information corresponding to the ID. Then, the ID management section 16 obtains an IP address of the second MFP 101' from the MFP table as shown by Table 2 and controls the network communication section 105 to transmit the piece of proper information to the second MFP 101' (step S111). Then, the ID management section 16 controls the touch panel 13 to display that cell-phone printing with the second MFP 101' has been reserved (step S112). Thereafter, the user of the cell-phone 4-1 moves to the second MFP 101'.

Next, referring to FIGS. 13 and 14, operation of the second MFP 101' is described. The ID management section 16' of the second MFP 101' receives the piece of proper information from the first MFP 101 via the network communication section 105' (step S200). Thereafter, the processing goes to step S1. Processes carried out by the second MFP 101' at steps S1 to S4 are the same as the processes carried out by the MFP 1 at steps S1 to S4 shown in FIG. 5, and descriptions of these processes are omitted.

When the user makes a deposit at step S4, the ID management section 16' permits communication with the cell-phone 4-1 of which proper information is identical with the piece of proper information sent from the first MFP 101 (step S211). Thereafter, the processing goes to step S12. Processes carried out by the second MFP 101' at steps S12 to S22 are the same as the processes carried out by the MFP 1 at steps S12 to S22 shown in FIG. 6, and descriptions of these processes are omitted. That is all about operation of the first MFP 101 and operation of the second MFP 101'.

In the image forming system comprising the first MFP 101 and the second MFP 101', a reservation for cell-phone printing can be made with the first MFP 101, and cell-phone printing based on the reservation can be executed with the second MFP 101'.

In the image forming system, only the piece of proper information of the cell-phone 4-1 is transmitted from the first MFP 101 to the second MFP 101', and the pieces of proper information of the cell-phones 4-2 and 4-3 are not transmitted from the first MFP 101 to the second MFP 101'. Thus, only the least necessary information is transmitted via the network, and the possibility of information leak is low.

Further, in the image forming system comprising the first MFP 101 and the second MFP 101', like in the MFP 1, with simple operation and with simple management of information, the trouble that a user other than a user who has made a deposit may execute cell-phone printing by spending the deposit can be avoided.

In the second embodiment, the first MFP 101 is used for reservation of cell-phone printing, and the second MFP 101' is used for execution of cell-phone printing. However, the second MFP 101' may be used for reservation of cell-phone printing, and the first MFP 101 may be used for execution of cell-phone printing.

In the second embodiment, the first MFP 101 and the second MFP 101' are not necessarily connected to be communicable with each other. When the MFPs 101 and 101' are not connected to be communicable with each other, however, a code must be set commonly in the first MFP 101 and in the second MFP 101'. This case is described below.

The ID management section 16 controls the communication controller 19 and the wireless communication section 22 to send the code to the cell-phone 4-1 of which proper information is identical with the piece of proper information corresponding to the ID input at step S10 in FIG. 12. The user of the cell-phone 4-1 which has received the code moves to the second MFP 101'.

As in the process at step S14 in FIG. 14, the cell-phone 4-1 makes an access to the second MFP 101'. At this moment, the cell-phone 4-1 sends its proper information and the code to the second MFP 101'. At step S14, the ID management section 16' of the second MFP 101' decodes the code instead of making a judgment on the proper information. Then, only when the ID management section 16' can decode the code, the communication controller 19' permits communication with the cell-phone 4-1 which has made an access.

With the arrangement above, even if the first MFP 101 and the second MFP 101' are not connected to be communicable with each other, reservation of cell-phone printing can be made at the first MFP 101.

Third Embodiment

An image forming system according to a third embodiment of the present invention is hereinafter described. The image forming system according to the third embodiment is of the same structure as the image forming system according to the second embodiment. Therefore, the structure of the image forming system according to the third embodiment is described with reference to FIG. 11, which is a block diagram showing the relationship among the first MFP 101, the second MFP 101' and the cell-phones 4-1, 4-2 and 4-3.

As in the second embodiment, in the image forming system according to the third embodiment, the first MFP 101 is used for reservation of cell-phone printing, and the second MFP 101' is used for execution of cell-phone printing. The differences between the second embodiment and the third embodiment are described below. In the second embodiment, the first MFP 101 issues IDs and sends the proper information of the cell-phone 4-1 to the second MFP 101'. In the third embodiment, however, the first MFP 101 obtains proper information of the cell-phones 4 (4-1, 4-2 and 4-3) existing in the periphery and sends all the pieces of proper information to the second MFP 101'. Then, the second MFP 101' issues IDs for the respective pieces of proper information and sends the IDs to the corresponding cell-phones 4 (4-1, 4-2 and 4-3). Also, the second MFP 101' promotes the user of the cell-phone 4-1 to input the ID. Then, the second MFP 101' identifies the cell-phone 4-1 based on the input ID and accepts a command for cell-phone printing only from the identified cell-phone 4-1. This is described in detail below.

The structure of the first MFP 101 and the structure of the second MFP 101' in the third embodiment are the same as those in the second embodiment as shown by FIG. 11. However, the functions of the first MFP 101 and the second MFP 101' in the third embodiment are partly different from those in the second embodiment. In the following, mainly the differences are described.

First, the first MFP 101 is described. The wireless communication section 22 is an interface for short-distance communication with the cell-phones 4 (4-1, 4-2 and 4-3) by Bluetooth and is incorporated with an antenna for sending and receiving radio wave. The CPU 15 is a controller of the first MFP 101 and comprises an ID management section 16, a job controller 18, a communication controller 19 and an accounting section 20.

The communication controller 19 controls the wireless communication section 22. Specifically, the communication controller 19 works, in cooperation with the wireless communication section 22, to obtain proper information of the cell-phones 4 (4-1, 4-2 and 4-3) which exist in the periphery of the first MFP 101.

The touch panel 13 is an interface for displaying information and for permitting a user to input information by touching. In this embodiment, the touch panel 13 permits a user of a cell-phone 4 to select one from a plural number of MFPs as an MFP for executing cell-phone printing.

The storage section 21 is stored with an MFP table as shown by Table 2 in which MFPs communicable with the first MFP 101 and IP addresses of the MFPs are recorded.

The network communication section 105 is an interface for connecting the first MFP 101 to a network. Specifically, the network communication section 105 transmits the proper information obtained by the communication section 19 to the second MFP 101'.

Next, the second MFP 101' is described. The wireless communication section 22' is an interface for short-distance communication with the cell-phones 4 (4-1, 4-2 and 4-3) by Bluetooth and is incorporated with an antenna for sending and receiving radio wave. The CPU 15' is a controller of the second MFP 101' and comprises an ID management section 16', a job controller 18', a communication controller 19' and an accounting section 20'.

The network communication section 105' is an interface for connecting the first MFP 101' to a network. Specifically, the network communication section 105' receives proper information transmitted from the first MFP 101.

The ID management section 16' issues IDs for respective pieces of proper information received by the network communication section 105'.

The communication controller 19' works, in cooperation with the wireless communication section 22', to send the IDs to the corresponding cell-phones 4 (4-1, 4-2 and 4-3).

The touch panel 13' is an interface for displaying information and for permitting a user to input information by touching. The input section 14' is an interface for permitting a user to input information by touching and receives an input of an ID from a user.

The communication controller 19' works, in cooperation with the wireless communication section 22', to receive proper information of a cell-phone 4 on receiving an access from the cell-phone 4.

The ID management section 16' judges whether the proper information received by the communication controller 19' is identical with the proper information input at the input section 14'.

The communication controller 19' permits only the cell-phone 4 which is identified by the ID management section 16' to communicate via the wireless communication section 22'. The job controller 18' commands the printing section 12' to print an image in response to a command for cell-phone printing from the cell-phone 4.

On completion of a printing process, the accounting section 20' works, in cooperation with the coin box 3, to deduct charges for the printing process from the deposit in the coin box 3.

The storage section 21' is, for example, a rewritable storage medium such as a hard disk or the like, and the storage section 21' is stored with the management table as shown by Table 1.

The executing section 25' executes a process in accordance with a command from the job controller 18'. The process is, for example, a process of confirming the remaining of toner and the remaining of paper.

[Operation of First MFP and Operation of Second MFP]

Figure 16:
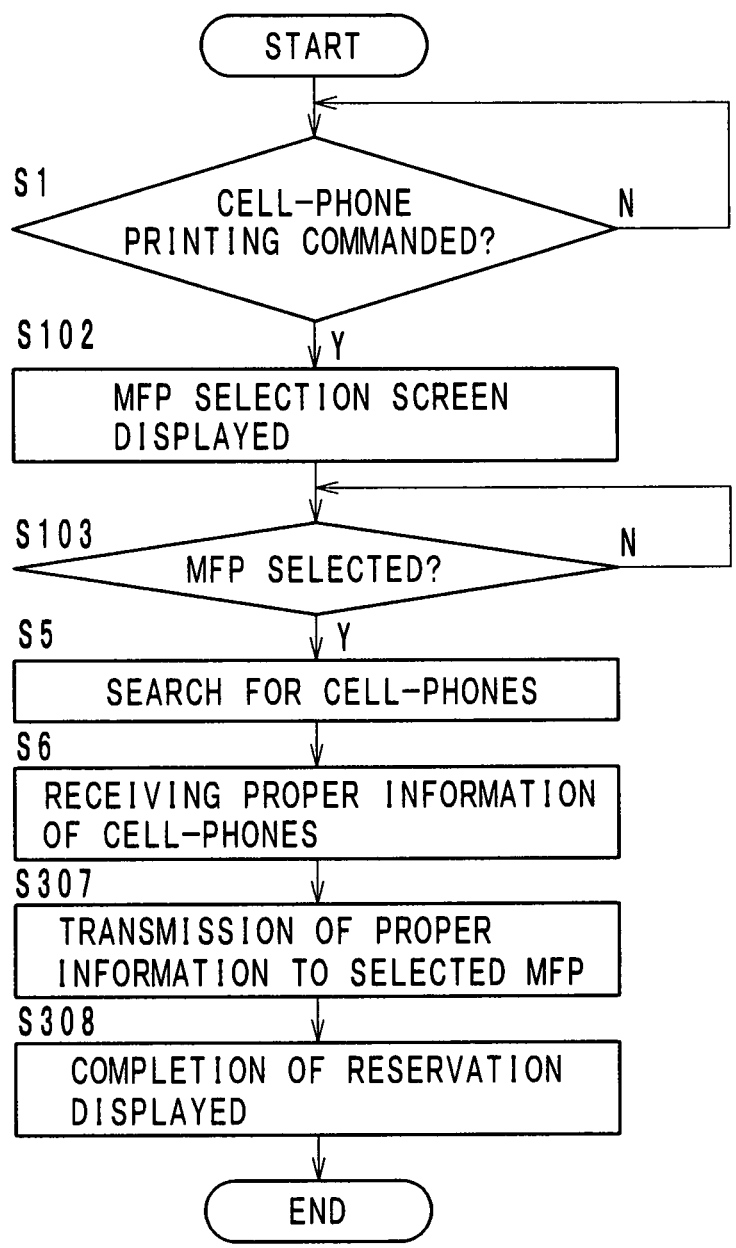
FIG. 16 is a flowchart showing a procedure carried out by a CPU of a first MFP in an image forming system according to a third embodiment.
Figure 17:
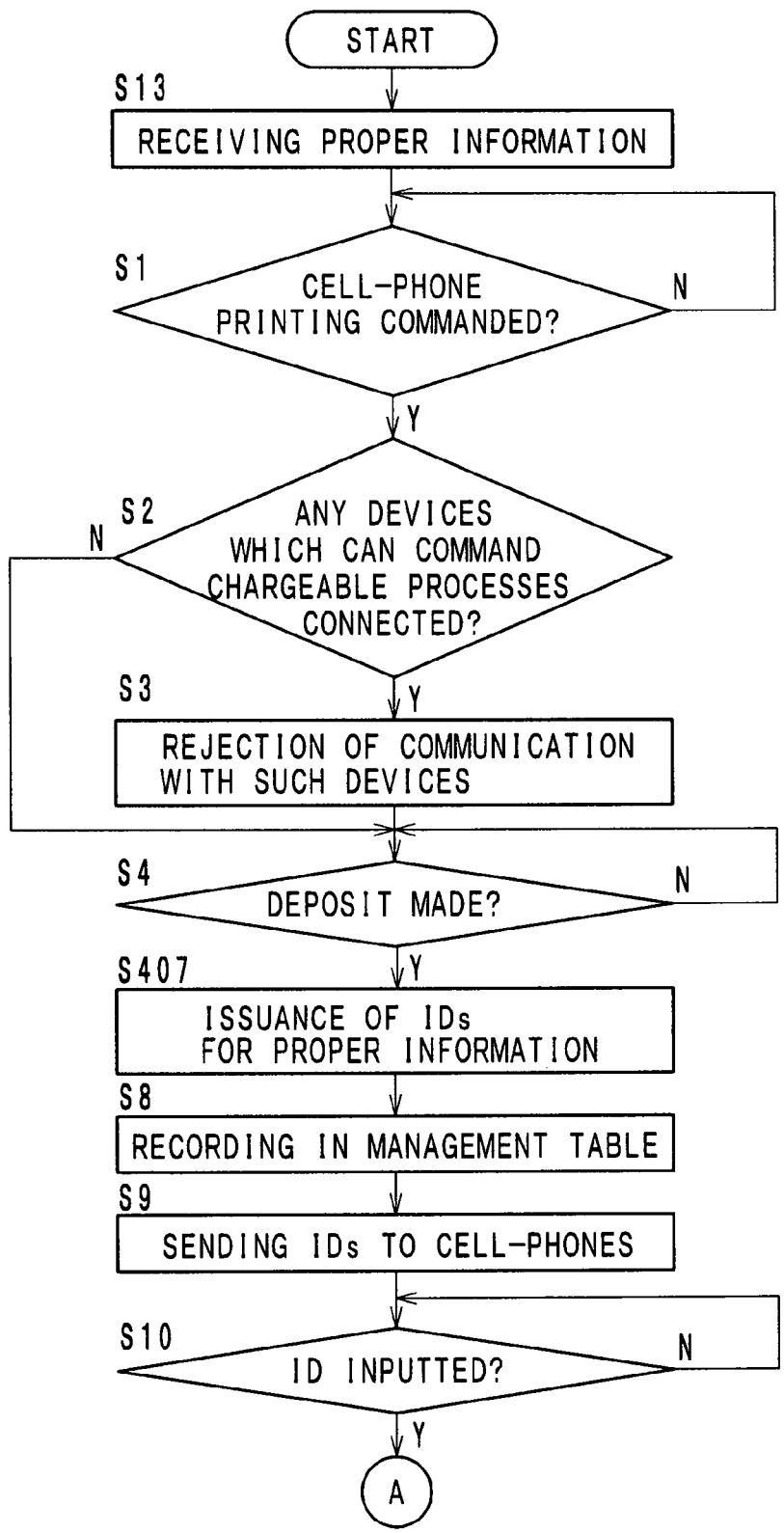
FIG. 17 is a flowchart showing a procedure carried out by a CPU of a second MFP in the image forming system according to the third embodiment.

Referring to FIGS. 16, 17 and 6, operation of the first MFP 101 and operation of the second MFP 101' are described. FIG.

16 is a flowchart showing a procedure carried out by the CPU 15 of the first MFP 101, and FIGS. 17 and 6 are flowcharts showing a procedure carried out by the CPU 15' of the second MFP 101'. Processes carried out by the CPU 15' of the second MFP 101' at steps S11 to S22 are the same as the processes carried out by the CPU 15 of the MFP 101 at steps S11 to S22 in the first embodiment. Therefore, the processes carried out by the CPU 15' of the second MFP 101' at steps S11 to S22 are described with reference to FIG. 6. Processes in the flowcharts may be executed by using softwares in the CPU 15 and in the CPU 15' or by using hardware circuits for exclusive use.

First, operation of the first MFP 101 is described with reference to FIG. 16. Processes carried out by the first MFP 101 at steps S1, S102, S103, S5 and S6 in the third embodiment are the same as the processes carried out by the first MFP 101 at steps S1, S102, S103, S5 and S6 in the second embodiment, and descriptions of these processes are omitted.

The ID management section 16 receives three pieces of proper information of the cell-phones 4 (4-1, 4-2 and 4-3) at step S6, and at step S307, the ID management section 16 sends all the three pieces of proper information to the second MFP 101' selected at step S103. More specifically, the ID management section 16 obtains an IP address of the second MFP 101' from the MFP table as shown by Table 2 and controls the network communication section 105 to transmit the pieces of proper information to the MFP 101'. Then, the ID management section 16 controls the touch panel 13 to display that a reservation of cell-phone printing with the second MFP 101' has been made (step S308). Thereafter, the user of the cell-phone 4-1 moves to the second MFP 101'.

Next, operation of the second MFP 101' is described with reference to FIGS. 17 and 6. At step S13, the ID management section 16' of the second MFP 101' receives the pieces of proper information from the first MFP 101 via the network communication section 105'. Thereafter, the processing goes to step S1. Processes carried out by the second MFP 101' at steps S1 to S4 are the same as the processes carried out by the MFP 1 at steps S1 to S4 in FIG. 5, and descriptions of these processes are omitted.

At step S4, when the user of the cell-phone 4-1 makes a deposit, the ID management section 16 issues mutually different IDs for the three pieces of proper information sent from the first MFP 101 (step S407). Thereafter, the processing goes to step S8. Processes carried out by the second MFP 101' at steps S8 to S22 are the same as the processes carried out by the MFP 1 at steps S8 to S22 in FIGS. 5 and 6, and descriptions of these processes are omitted. That is all about operation of the first MFP 101 and operation of the second MFP 101'.

In the image forming system comprising the first MFP 101 and the second MFP 101', a reservation for cell-phone printing can be made with the first MFP 101, and cell-phone printing based on the reservation can be executed with the second MFP 101'.

Further, in the image forming system according to the third embodiment, like in the image forming system according to the second embodiment, with simple operation and with simple management of information, the trouble that a user other than a user who has made a deposit may execute cell-phone printing by spending the deposit can be avoided.

Other Embodiments

In the third embodiment, the first MFP 101 is used for reservation of cell-phone printing, and the second MFP 101' is used for execution of cell-phone printing. However, the second MFP may be used for reservation of cell-phone printing, and the first MFP may be used for execution of cell-phone printing.

In the first, the second and the third embodiments, the cell-phone 4-1 sends image data in commanding cell-phone printing. The command, however, does not necessarily include image data. For example, the command may include an IP address of a server stored with image data to be printed by the MFP. In this case, the MFP makes an access to the server and downloads the image data.

Also, in the first, the second and the third embodiments, the MFPs print images. However, the objects to be printed are not necessarily images but may be, for example, texts and photos.

In the first, the second and the third embodiments, the user inputs an ID at the input section 14 or 14' of the MFP 1, the first MFP 101 or the second MFP 101'. However, other ways of inputting an ID are possible, and for example, an ID may be sent from the cell-phone 4-1 by wireless.

In the first, the second and the third embodiments, at step S12, S13, S14, S16 or S17 in FIG. 6 or 10, the MFP 1 or the second MFP 101' obtains the proper information of the cell-phone 4-1 which has made an access thereto and makes a judgment on identification of the cell-phone 4-1 based on the proper information. Then, when the cell-phone 4-1 is identified, the MFP 1 or the second MFP 101' sends communication permission to the cell-phone 4-1, and in response to the communication permission, the cell-phone 4-1 sends a command for cell-phone printing.

However, other processes are possible. For example, immediately before step S12, the cell-phone 4-1 may send image data concurrently with making an access to the MFP 1 or the second MFP 101'. In this case, the MFP 1 or the second MFP 101' makes a judgment on identification of the cell-phone 4-1 based on its proper information, and when the cell-phone 4-1 is identified, the MFP 1 or the second MFP 101' receives the image data. When the cell-phone 4-1 is not identified, the MFP 1 or the second MFP 101' destructs the image data. With these processes, the MFP 1 or the second MFP 101' can omit the process at step S16 of sending communication permission.

The user of the cell-phone 4-1 makes a deposit in the coin box 3 immediately before step S5 in FIG. 5, step S211 in FIG. 14 or step S407 in FIG. 17. However, the user may make a deposit in the coin box 3 at any time as long as it is before step S18 in FIG. 6 or in FIG. 10, where the MFP 1 or the MFP 101' starts printing.

In the first, the second and the third embodiments, the image forming system may be modified such that only cell-phones 4 of a specified carrier or of a specified maker can command cell-phone printing. In this case, the MFP 1, the first MFP 101 or the second MFP 101' gives permission for cell-phone printing to the cell-phones 4 in accordance with carrier information recorded in the management table as shown by Table 1.

In the first, the second and the third embodiments, the MFP 1 or the second MFP 101' prints an image in accordance with image data sent from the cell-phone 4. At this stage, the MFP 1 or the second MFP 101' may execute other processes as well as the printing process. For example, the MFP 1 or the second MFP 101' may compose an image read by the scanning section 11 or 11' with the image data sent from the cell-phone 4.

The MFP 1 or the second MFP 101' may execute the following process instead of a process of printing data sent from the cell-phone 4. First, the MFP 1 or the second MFP 101' sends the data sent from the cell-phone 4 to an external device connected to the MFP 1 or the second MFP 101'. The external device performs optical character reading of the data or analyzes the data to translate the data or to make a fair copy of the data.

In the first, the second and the third embodiments, the image forming system may be structured such that while the MFP 1, the first MFP 101 or the second MFP 101' is communicating with the cell-phone 4-1, the other cell-phones 4-2 and 4-3 can obtain information on the status of the MFP 1, 101 or 101' (the remaining of toner and the remaining of paper, etc.) by wireless.

In the first, the second and the third embodiments, the MFP 1, the first MFP 101 or the second MFP 101' collects money for a chargeable process by deducting the charges from the deposit in the coin box 3. However, other ways of collecting money are possible. For example, notes, a prepaid card, an IC card, a cash card, etc. may be used instead of coins.

In the first, the second and the third embodiments, Bluetooth (trade name) is used for short-distance wireless communication. However, short-distance wireless communication can be performed by other ways, such as infrared transfer, UWB (ultra wide band), etc.

In the first, the second and the third embodiments, the communication terminals are cell-phones. However, the communication terminals may be, for example, PDAs with a communication function, notebook PCs, etc.

In the first, the second and the third embodiments, the number of cell-phones 4 is three, but any number of cell-phones 4 may be comprised in the image forming system.

In the first, the second and the third embodiments, an MFP is described as the image forming apparatus. However, the image forming apparatus is not necessarily an MFP and may be, for example, a printer, a facsimile or the like as long as it is communicable with communication terminals.

Although the present invention has been described in connection with the preferred embodiments above, it is to be noted that various changes and modifications are possible to those who are skilled in the art. Such changes and modifications are to be understood as being within the scope of the present invention.

What is claimed is:

1. An image forming apparatus which is wirelessly communicable with communication terminals, said image forming apparatus comprising:
    a proper information obtaining section for obtaining pieces of proper information of the communication terminals respectively from the communication terminals;
    an ID issuing section for issuing pieces of identification information for the respective pieces of proper information;
    a storage section for storing the pieces of proper information and the pieces of identification information with the pieces of proper information related to the respective pieces of identification information;
    a sending section for sending the pieces of identification information to the corresponding communication terminals;
    an ID reception section for a user to directly manually input identification information;
    a receiving section for receiving proper information of a communication terminal operated by the user when receiving an access from the communication terminal operated by the user;
    a searching section for searching the storage section for a piece of proper information associated with the identification information manually inputted by the user directly into the ID reception section;
    a first judging section for judging whether the proper information received by the receiving section is identical with the proper information found by the searching section;
    a communication controlling section for permitting acceptance of a process execution command only from the communication terminal which the first judging section judges that the proper information received by the receiving section is identical with the proper information found by the searching section, and for rejecting acceptance of the process execution command from the other communication terminal which the first judging section judges that the proper information received by the receiving section is not identical with the proper information found by the searching section; and
    a process executing section for executing a process in accordance with the process execution command accepted by the receiving section,
    wherein when the process executing section has completed the process, the communication control section cancels the state of the permission of the process execution command for the communication terminal of which proper information was judged by the first judging section to be identical and cancels the state of the rejection of the process execution command for the other communication terminal of which proper information was judged by the first judging section to be identical, such that the image forming apparatus is reset to an initial state.

2. The image forming apparatus according to claim 1, wherein:
    the process execution command is a print command; and
    the process executing section is a printing section.

3. The image forming apparatus according to claim 1, wherein the ID reception section includes an interface for permitting the user of the communication terminal to input identification information.

4. The image forming apparatus according to claim 1, further comprising an accounting section for receiving a deposit made by the user of the communication terminal before the process executing section starts executing a process.

5. The image forming apparatus according to claim 4, wherein, when the process executing section executes a process, the accounting section deducts charges for the process from the deposit made by the user.

6. The image forming apparatus according to claim 1, wherein the receiving section receives an operation command from the communication terminal which has made an access thereto, said image forming apparatus further comprising:
    a second judging section for, before the first judging section makes a judgment, judging whether the operation command from the communication terminal is to command a chargeable operation; and
    an operation executing section for, when the second judging section judges that the operation command from the communication terminal is not to command a chargeable operation, executing the operation according to the operation command without a judgment by the first judging section.

7. The image forming apparatus according to claim 1, wherein the communication terminals are cell-phones.

8. The image forming apparatus according to claim 1, further comprising a communication controller that searches for communication terminals near the image forming apparatus so that the proper information obtaining section obtains pieces of proper information from communication terminals near the image forming apparatus.

9. The image forming apparatus according to claim 1, further comprising:
a communication section that transmits radio waves; and
a communication controller that searches for communication terminals near the image forming apparatus by instructing the communication section to transmit radio waves.

10. The image forming apparatus according to claim 1, further comprising a communication section for short-distance wireless communication with the communication terminals.

11. The image forming apparatus according to claim 1, further comprising a communication section for communicating with the communication terminals by Bluetooth.

12. The image forming apparatus according to claim 1, further comprising a communication control section for canceling a communication permission given to the communication terminal which has accessed the image forming apparatus after the process has been executed by the process executing section.

13. The image forming apparatus according to claim 1, wherein the respective pieces of identification information issued by the ID issuing section for each piece of proper information are unique.

* * * * *